United States Patent
Nelson et al.

(10) Patent No.: US 12,190,012 B2
(45) Date of Patent: Jan. 7, 2025

(54) AUDIO STACK POWER CONTROL BASED ON LATENCY

(71) Applicant: Intel Corporation, Santa Clara, CA (US)

(72) Inventors: Aruni Nelson, Folsom, CA (US); Adeel Aslam, Folsom, CA (US); Abdul Ismail, Beaverton, OR (US); Devon Worrell, Folsom, CA (US); Binu John, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 17/482,070

(22) Filed: Sep. 22, 2021

(65) Prior Publication Data

US 2022/0004354 A1 Jan. 6, 2022

(51) Int. Cl.
*G06F 3/16* (2006.01)

(52) U.S. Cl.
CPC .................. *G06F 3/162* (2013.01)

(58) Field of Classification Search
CPC ......... G06F 3/165; G06F 17/00; G06F 1/3203
USPC ........................................................... 700/94
See application file for complete search history.

(56) References Cited

U.S. PATENT DOCUMENTS

| | | | |
|---|---|---|---|
| 9,591,582 B1* | 3/2017 | Rabii | H04L 43/028 |
| 2014/0229751 A1* | 8/2014 | Manav | G06F 1/3278 |
| | | | 713/323 |
| 2015/0110279 A1* | 4/2015 | Tejerina | G01H 3/14 |
| | | | 381/56 |
| 2017/0024064 A1* | 1/2017 | Wigdor | G06F 3/0421 |
| 2017/0142535 A1* | 5/2017 | Aggarwal | H04L 65/613 |
| 2022/0004354 A1* | 1/2022 | Nelson | G06F 3/165 |
| 2022/0337651 A1* | 10/2022 | Al-Dahleh | G10L 19/167 |
| 2022/0358727 A1* | 11/2022 | Gupta | G06T 19/006 |

* cited by examiner

*Primary Examiner* — Alexander Krzystan

(74) *Attorney, Agent, or Firm* — Hanley, Flight and Zimmerman, LLC

(57) ABSTRACT

Example apparatus disclosed herein compare one or more audio latency characteristics with one or more audio latency requirements in response to detection of an audio silence event, the audio latency characteristic(s) associated with at least one of a hardware layer or a device layer of an audio stack of a compute device, the audio latency requirement(s) associated with an application. Disclosed example apparatus also control a device layer of the audio stack to enter a device layer low power mode in response to a first determination that the audio latency requirement(s) is/are met by the audio latency characteristic(s). Disclosed example apparatus further control a hardware layer of the audio stack to enter a hardware layer low power mode in response to the first determination and a second determination that an operation condition for entry into the hardware layer low power mode is met.

25 Claims, 9 Drawing Sheets

AUDIO STACK POWER CONTROL BASED ON LATENCY

FIELD OF THE DISCLOSURE

This disclosure relates generally to power control and, more particularly, to audio stack power control based on latency.

BACKGROUND

Many compute devices include audio stacks to support audio capture and playback features. Such audio stacks can include an audio device layer associated with one or more audio capture and/or playback devices, an audio hardware layer associated with an audio controller and an audio interface in communication with the one or more audio capture and/or playback devices, a kernel software layer associated with one or more drivers to interact with the audio controller and an audio interface, and a user software layer associated with one or more user applications and operating system functionality that utilize the audio capture and playback features. During audio silence periods, such as audio capture mute events and audio playback pause or idle events, prior audio stacks keep their audio hardware and audio device layers active due to latency concerns related to transitioning to and from low power modes of operation.

Figure 1:
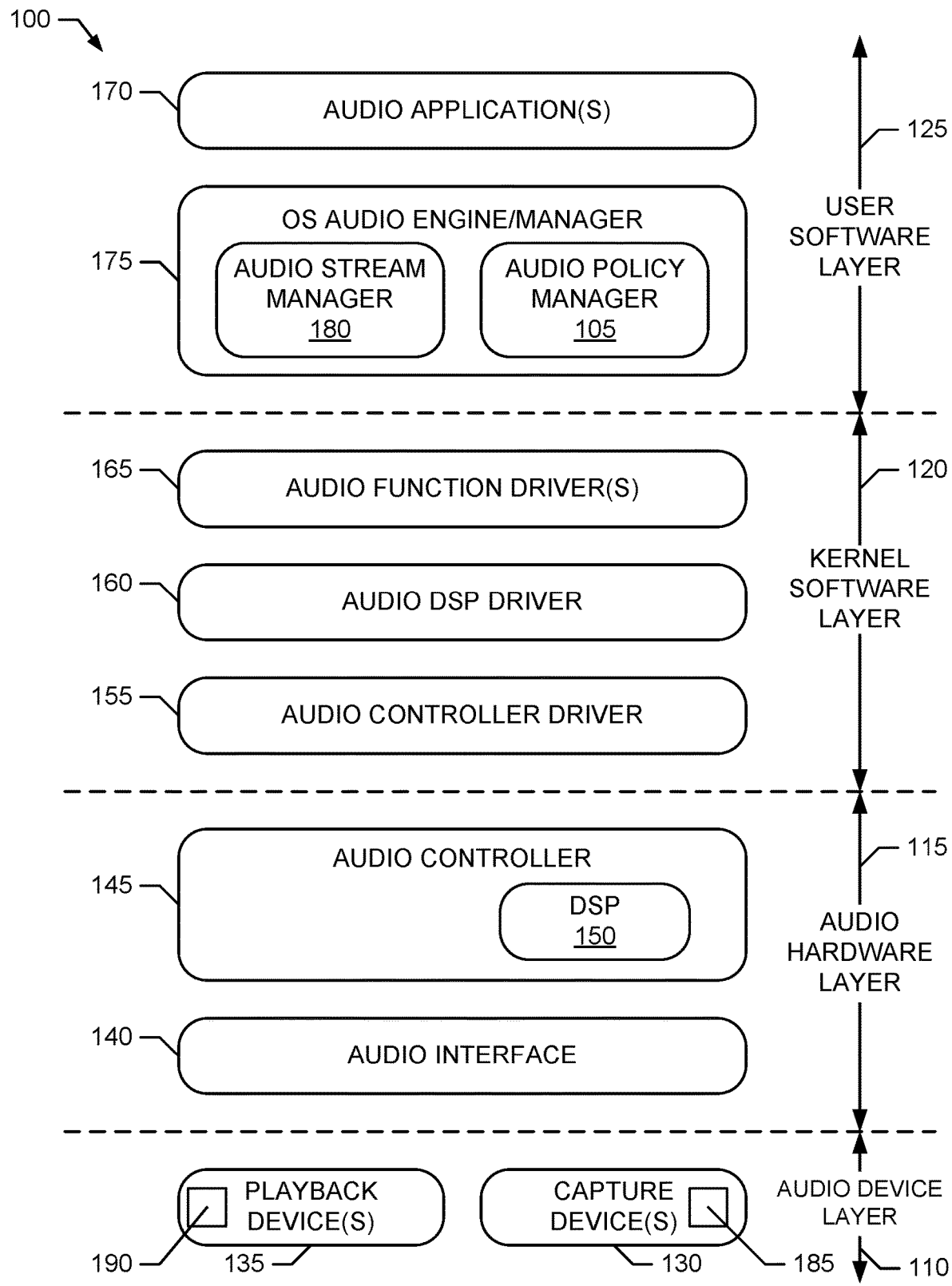
FIG. 1 is a block diagram of an example compute device audio stack including an example audio policy manager that is structured to implement audio stack power control based on latency in accordance with teachings of this disclosure.

The figures are not to scale. In general, the same reference numbers will be used throughout the drawing(s) and accompanying written description to refer to the same or like parts, elements, etc. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Example methods, apparatus, systems and articles of manufacture (e.g., physical storage media) to implement audio stack power control based on latency are disclosed herein. As noted above, many compute devices include audio stacks to support audio capture features, such as capturing of audio data with a microphone, and/or audio playback features, such as playback of audio data with one or more speakers, headsets, etc. Such audio stacks can include an audio device layer, an audio hardware layer, a kernel software layer, and a user software layer. In at least some implementations, the audio device layer includes one or more audio capture devices, (e.g., one or more microphones), one or more audio playback devices (e.g., one or more speakers, headsets, earbuds, etc.), and/or any other audio devices, such as hardware equalizers, amplifiers, etc. The audio hardware layer may include an audio interface with circuitry to interface with the device(s) of the audio device layer, an audio controller to implement one or more audio processing operations, such as, but not limited to, audio format conversion, audio mixing, audio equalization, etc. The kernel software layer may include one or more drivers to interact with the audio controller and/or the audio interface of the audio hardware layer, and/or to interact with the audio device(s) of the audio device layer. The user software layer may include one or more user applications that utilize the audio capture and playback features provide by the audio stack. In some implementations, the user software layer also includes the operating system (OS) features, such as OS application programming interface(s) (APIs), libraries, etc., that enable the user applications of the user software layer to access the rest of the audio stack (e.g., the drivers of the kernel software layer, the audio controller and or audio interface of the audio hardware layer, and/or the audio device(s) of the audio device layer).

In some examples, the audio hardware layer and/or the audio device layer of the audio stack support one or more low power modes to reduce power consumption relative to a normal operation mode of the compute device. For example, the capture and/or playback device(s) of the audio device layer may support one or more low power modes, respectively, that reduce power to, or turn off, one or more components/circuits of the devices to reduce power consumption. Likewise, the audio controller and/or audio interface may support one or more low power modes, respectively, that reduce power to, or turn off, one or more components/circuits, hardware blocks, etc., of the audio controller and/or audio interface to reduce power consumption. However, there may be latency associated with transitioning to and from a low power mode during which audio operations are affected by when the device/controller/interface/etc. is/are unavailable. Due to such latencies related to transitioning to and from low power modes of operation, prior audio stacks keep their audio hardware and audio device layers active during audio silence periods, such as audio capture mute events and audio playback pause or idle events, rather than taking advantage of the power savings offered by the different, supported low power modes.

In contrast with such prior audio stack implementations, example audio stacks implemented in accordance with teachings of this disclosure include an example audio policy manager that analyzes the latencies associated with power mode transitions and enables entering and exiting of the low power modes during audio silence periods. As disclosed in further detail below, such an example audio policy manager included in disclosed example audio stacks compares latency requirement(s) associated with audio application(s) and OS features executing in the user software layer with latency characteristic(s) associated with the low power modes provided by the audio hardware and audio device layers to determine whether low power mode(s) can be entered during an audio silence period and, if so, which low power mode(s) to activate. In some disclosed examples, the audio policy manager also detects audio activity events, which may be generated by the audio hardware layer and/or audio device layer, to efficiently exit the low power mode(s) and resume normal operation. As such, disclosed example audio stacks can enable compute devices to achieve potentially substantial power savings relative to use of prior audio stacks.

Turning to the figures, a block diagram of an example compute device audio stack 100 including an example audio policy manager 105 that is structured to implement audio stack power control based on latency in accordance with teachings of this disclosure is illustrated in FIG. 1. The example audio stack 100 of FIG. 1 includes an example audio device layer 110, an example audio hardware layer 115, an example kernel software layer 120, and an example user software layer 125. The audio stack 100 can be included in or otherwise implemented by any type of compute device that supports audio capture and/or audio playback functionality. For example, the audio stack 100 can be included in or otherwise implemented by a personal computer, a notebook/tablet computer, a smartphone, a mobile phone, a media device (e.g., such as a television, a set-top box, a digital versatile disk (DVD) player, etc.), a game console, etc.

In the illustrated example, the audio device layer 110 of the audio stack 100 includes one or more example audio capture devices 130 and one or more example audio playback devices 135. As such, in some examples, the audio hardware layer 115 may be implemented by audio devices, components, peripherals, etc., of a compute device associated with the audio stack 100. For example, the audio capture device(s) 130 may be implemented by one or more microphones, audio transducers, audio ports, etc., capable of capturing (e.g., sensing, detecting, measuring, etc.) audio. The audio playback device(s) 135 may be implemented by one or more speakers, audio transducers, headsets, earbuds, audio ports, etc., capable of playback (e.g., emitting, outputting, etc.) of audio. In some examples, the audio device layer 110 additionally or alternatively includes other audio devices/peripherals, such as hardware equalizers, amplifiers, etc., capable processing input and/or output audio.

In the illustrated example, the audio hardware layer 115 of the audio stack 100 includes an example audio interface 140 and an example audio controller 145. As such, in some examples, the audio hardware layer 115 may be implemented by hardware (e.g., circuitry) and/or firmware of a compute device associated with the audio stack 100. The audio interface 140 includes circuitry to interface with the audio capture device(s) 130 and the audio playback device(s) 135 of the audio device layer 110. In some examples, such circuitry can include one or more busses, control lines, amplifier circuits, digital-to-analog (D/A) and analog-to-digital (A/D) conversion circuits, etc., to interface with the audio capture device(s) 130 and the audio playback device(s) 135. For example, the circuitry can be used to read audio data from the audio capture device(s) 130, write audio data to the audio playback device(s) 135, control features of the audio capture device(s) 130 and the audio playback device(s) 135 (e.g., indicator lights, operating modes, etc.), etc., and activate/deactivate one or more power modes implemented by the audio capture device(s) 130 and the audio playback device(s) 135. For example, a given audio capture device 130 or a given audio playback device 135 may implement a single low power mode in which the components/circuits of the device are turned off (e.g., possibly with the exception of one or more components/circuits used to wake the device at a later time). In some examples, a given audio capture device 130 or a given audio playback device 135 may implement multiple low power modes in which different components/circuits, or combinations thereof, of the device can be turned off to provide finer power control granularity to trade off power savings vs. response latency. In some examples, the audio interface 140 itself also supports one or more low power modes in which some or all of its circuitry, or different combinations thereof, can be turned off to provide power savings and, possibly, to provide different levels of power savings to support different response latencies.

The audio controller 145 includes circuitry to implement one or more audio processing operations, such as, but not limited to, audio format conversion, audio mixing, audio equalization, etc. In the illustrated example, the audio controller 145 includes an example digital signal processor (DSP) 150 to implement some of the functionality offered by the audio controller. In the illustrated example, the audio controller 145 also supports one or more low power modes in which some or all of its circuitry, including the DSP 150, or different combinations thereof, can be turned off to provide power savings and, possibly, to provide different levels of power savings to support different response latencies.

In the illustrated example, the kernel software layer 120 of the audio stack 100 includes an example audio controller driver 155, an example audio DSP driver 160 and one or more example audio function drivers 165. As such, in some examples, the kernel software layer 120 may be implemented at a kernel layer in a compute device associated with the audio stack 100. The audio controller driver 155 provides application program interfaces (APIs), library/function calls, etc., to interact with the audio controller 145. For example, the audio controller driver 155 enables the user software layer 125 of the audio stack 100 to read audio data from the audio controller 145, write audio data to the audio controller 145, control/program the one or more audio processing operations implemented by the audio controller 145, enable and disable the one or more low power modes supported by the audio controller 145, etc. Similarly, the audio DSP driver 160 provides APIs, library/function calls, etc., to interact with the DSP 150. For example, the audio DSP driver 160 enables the user software layer 125 of the audio stack 100 to control/program the DSP 150, enable and disable the one or more low power modes supported by the DSP 150, etc.

Likewise, the audio function driver(s) 165 provides APIs, library/function calls, etc., to interact with the audio interface 140 and the devices 130/135 included in the audio device layer 110 of the audio stack 100. For example, a first one of the audio function drivers 165 enables the user software layer 125 of the audio stack 100 to control/program the audio interface 140 to interact with and read audio data from a first one of the capture devices 130, enable and disable the one or more low power modes supported by the first one of the capture devices 130, etc. In some examples, a second one of the audio function drivers 165 enables the user software layer 125 of the audio stack 100 to control/program the audio interface 140 to interact with and write audio data to a first one of the playback devices 135, enable and disable the one or more low power modes supported by the first one of the playback devices 135, etc. In some examples, each one of the capture devices 130 and each one of the playback devices 135 may have a corresponding audio function driver 165. However, in some examples, multiple ones of the capture devices 130 and/or the playback devices 135 may share a corresponding audio function driver 165.

In the illustrated example, the user software layer 125 of the audio stack 100 includes one or more example user applications 170 that utilize the audio capture and playback features provide by the audio stack. For example, the user applications 170 may include one or more media player applications, one or more streaming media applications, one or more video conferencing applications, one or more application with voice-to-text and/or text-to-voice features, etc. In the illustrated example, the user software layer also includes an example operating system (OS) audio engine 175 implemented by an OS of a compute device associated with the audio stack 100. The OS audio engine 175 of the illustrated example includes OS-level APIs, libraries, functions, etc., that enable the user applications 170 of the user software layer 125 to access the rest of the audio stack 100, such as the drivers 155/160/165 of the kernel software layer 120, the audio controller 145 and/or audio interface 140 of the audio hardware layer 115, and/or the audio device(s) 130/135 of the audio device layer 110. In some examples, the OS audio engine 175 is referred to as an OS audio manager 175, an OS audio engine/manager 175, etc.

The OS audio engine 175 of FIG. 1 also includes the audio policy manager 105 and an example audio stream manager 180. As disclosed in further detail below, the audio stream manager 180 is structured to stop and start audio streams at a software layer (e.g., the user software layer 125) of the audio stack 100. For example, the audio policy manager 105 can invoke the audio stream manager 180 to stop and start a capture audio stream, a playback audio stream, etc., as part of implementing power control of the audio stack 100.

As mentioned above and disclosed in further detail below, the audio policy manager 105 implements power control of the audio stack 100. In the illustrated example, in response to detection of an audio silence event (e.g., a playback pause event, a playback stop event, a playback mute event, a capture mute event, a capture pause event, a capture stop event, etc.), the audio policy manager 105 analyzes the latencies associated with available low power mode modes offered by the audio stack 100 and enables entering and exiting of one or more of the low power modes during the audio silence periods. For example, the audio policy manager 105 compares latency requirement(s) associated with the audio application(s) 170 and/or the OS features executing in the user software layer 125 with latency characteristic(s) associated with the low power mode(s) provided by the audio hardware layer 115 (e.g., the low power mode(s) of the audio controller 145 and/or the audio interface 140) and/or the audio device layer (e.g., the low power mode(s) of the capture device(s) 130 and/or the playback device(s) 135) to determine whether low power mode(s) can be entered during an audio silence period and, if so, which low power mode(s) to activate. As such, the audio policy manager 105 may invoke one or more of the drivers 155/160/165 to activate and deactivate low power mode(s) at different layers of the audio stack 100.

In the illustrated example, the audio policy manager 105 also detects audio activity events to efficiently exit the low power mode(s) and resume normal operation. In some examples, the audio activity events are generated by audio controls (e.g., unmute, unpause, etc.) implemented by the audio application(s) 170 and/or the OS features executing in the user software layer 125. In some examples, the audio activity events are generated by the audio hardware layer 115 (e.g., the audio controller 145 and/or the audio interface 140) and/or the audio device layer (e.g., the capture device(s) 130 and/or the playback device(s) 135). For example, one or more of the capture devices 130 can include corresponding example audio activity detection circuitry 185 to detect audio activity (e.g., such as by detecting acoustic power, performing voice activity detection, etc.) Likewise, in some examples, one or more of the playback devices 135 can include corresponding example audio activity detection circuitry 190 to detect audio activity (e.g., such as by detecting acoustic power, performing voice activity detection, etc.)

Figure 2:
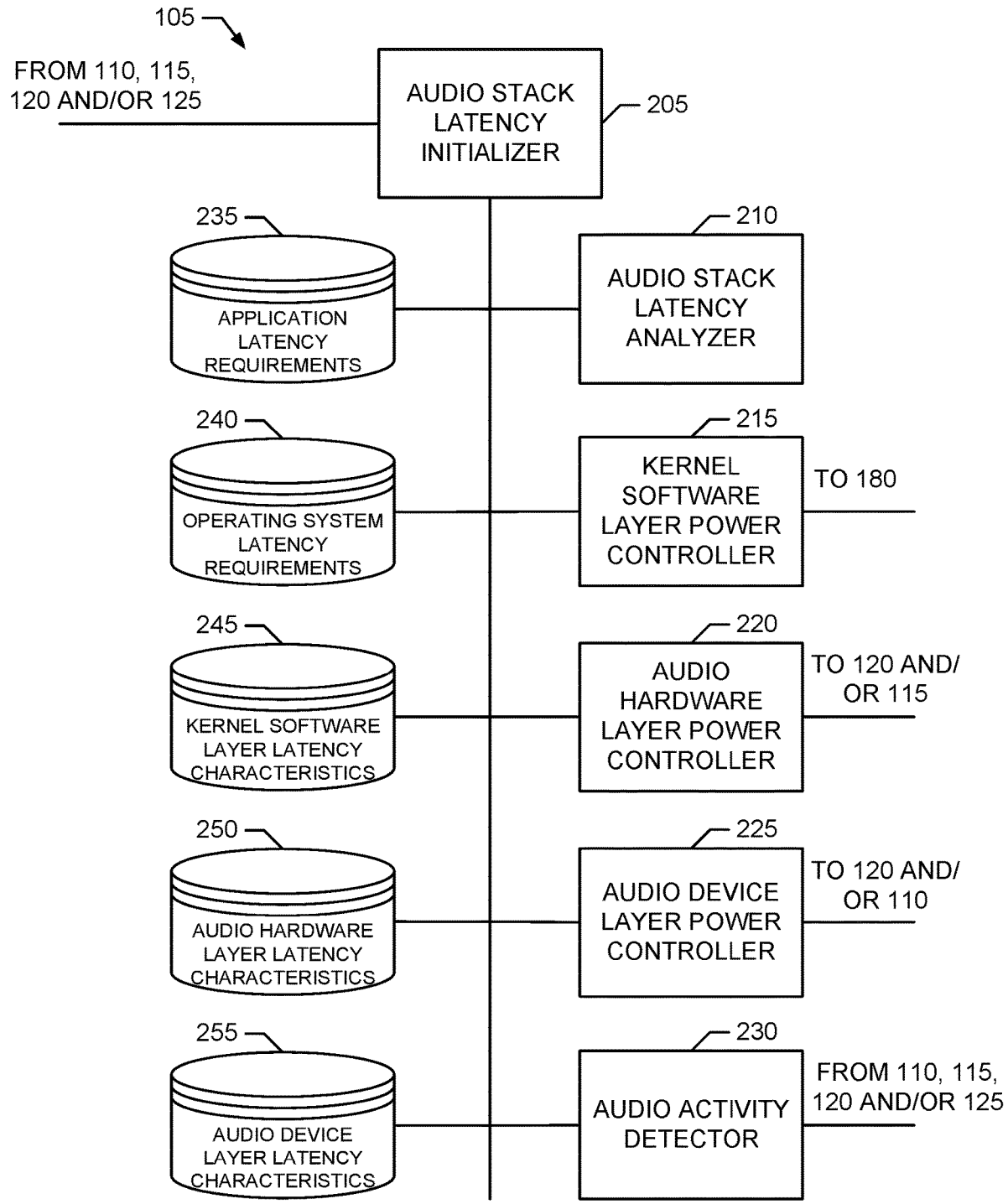
FIG. 2 is a block diagram of an example implementation of the audio policy manager of FIGS. 1 and/or 2.

A block diagram of an example implementation of the audio policy manager 105 of FIG. 1 is illustrated in FIG. 2. The example audio policy manager 105 of FIG. 2 includes an example audio stack latency initializer 205, an example audio stack latency analyzer 210, an example kernel software layer power controller 215, an example audio hardware layer power controller 220, an example audio device layer power controller 225 and an example audio activity detector 230. The example audio policy manager 105 of FIG. 2 also includes an example application latency requirements storage 235, example OS latency requirements storage 240, example kernel software layer latency characteristics storage 245, example audio hardware layer latency characteristics storage 250 and example audio device layer latency characteristics storage 255.

In the illustrated example, the audio stack latency initializer 205 is invoked (e.g., during power-up/boot of the compute device associated with the audio stack 100, when one or more of the application(s) 170 is/are executed, etc.) to read, from the application(s) 170, one or more application latency requirements associated with power mode transitions and to store the application latency requirement(s) in the application latency requirements storage 235. Additionally or alternatively, in some examples, the audio stack latency initializer 205 is invoked (e.g., during power-up/boot of the compute device associated with the audio stack 100, when one or more of the features of the OS audio engine 175 is/are executed, etc.) to read, from the OS audio engine 175, one or more OS latency requirements associated with power mode transitions and to store the OS latency requirement(s) in the OS latency requirements storage 240. Additionally or alternatively, in some examples, the audio stack latency initializer 205 is invoked during an initialization procedure (e.g., performed during manufacturing, at power-up/boot of the compute device associated with the audio stack 100, etc.) to pre-store one or more of the application latency requirement(s) and/or the OS latency requirement(s) in the application latency requirements storage 235 and/or the OS latency requirements storage 240. The application latency requirement(s) and/or the OS latency requirement(s) can be any type of latency requirements associated with activation and deactivation of low power mode(s) in the audio stack 100. For example, the application latency requirement(s) and/or the OS latency requirement(s) may specify one or more limits (e.g., upper limit(s)) on time period(s) in which audio samples of an audio stream may be missed (e.g., due to low power mode activation) without loss of synchronization of the audio stream in the associated application 170, OS feature, etc. In some examples, different application latency requirement(s) and/or the OS latency requirement(s) (e.g., different limits) may be specified for playback audio streams (e.g., associated with audio data to be provided to one or more of the playback devices 135 for output) vs. capture audio streams (e.g., associated with audio data to be received from one or more of the capture devices 130). Other examples of the application latency requirement(s) and/or the OS latency requirement(s) include, but are not limited to, buffering requirements, network latency requirements, any particular data processing requirements, streaming requirements, compression/decompression requirements, etc.

In the illustrated example, the audio stack latency initializer 205 is also invoked (e.g., during power-up/boot of the compute device associated with the audio stack 100, when the audio stack 100 begins execution, etc.) to read, from the audio stream manager 180 and/or other elements of the OS audio engine 175, one or more kernel software layer latency characteristics associated with power mode transitions and to store the kernel software layer latency characteristic(s) in the kernel software layer latency characteristics storage 245. Additionally or alternatively, in some examples, the audio stack latency initializer 205 is invoked during an initialization procedure (e.g., performed during manufacturing, at power-up/boot of the compute device associated with the audio stack 100, etc.) to pre-store one or more of the kernel software layer latency characteristic(s) in the kernel software layer latency characteristics storage 245. For example, the kernel software layer latency characteristics may specify one or more limits (e.g., upper limit(s)) on time period(s) associated with stopping an audio stream, starting an audio stream, etc. In some examples, different kernel software layer latency characteristics may be specified for playback audio streams (e.g., associated with audio data to be provided to one or more of the playback devices 135 for output) vs. capture audio streams (e.g., associated with audio data to be received from one or more of the capture devices 130). Other examples of the kernel software layer latency characteristic(s) include, but are not limited to, buffering, analog-to-digital and/or digital-to-analog conversion characteristics, compression/decompression algorithm characteristics, encoding/decoding process characteristics, etc.

In the illustrated example, the audio stack latency initializer 205 is also invoked (e.g., during power-up/boot of the compute device associated with the audio stack 100, when the audio stack 100 begins execution, etc.) to read, from the audio hardware layer 115, one or more audio hardware layer latency characteristics associated with power mode transitions and to store the audio hardware layer latency characteristic(s) in the audio hardware layer latency characteristics storage 250. Additionally or alternatively, in some examples, the audio stack latency initializer 205 is invoked during an initialization procedure (e.g., performed during manufacturing, at power-up/boot of the compute device associated with the audio stack 100, etc.) to pre-store one or more of the audio hardware layer latency characteristic(s) in the audio hardware layer latency characteristics storage 250. For example, the audio stack latency initializer 205 may invoke the audio controller driver 155 to read, from the driver 155 and/or the audio controller 145 itself, one or more latency characteristics associated with one or more low power modes supported by the audio controller 145. Additionally or alternatively, in some examples, the audio stack latency initializer 205 may invoke the audio DSP driver 160 to read, from the driver 160 and/or the DSP 150 itself, one or more latency characteristics associated with one or more low power modes supported by the DSP 150. Additionally or alternatively, in some examples, the audio stack latency initializer 205 may invoke one or more of the audio function drivers 165 to read, from the driver 165 and/or the audio interface 140 itself, one or more latency characteristics associated with one or more low power modes supported by the audio interface 140. In some examples, the audio hardware layer latency characteristics associated with the audio controller 145, the DSP 150 and/or the audio interface 140 may specify one or more limits (e.g., upper limit(s)) on time period(s) associated with activating and deactivating different low power modes supported by the audio controller 145, the DSP 150 and/or the audio interface 140, etc. For example, deeper low power modes (e.g., associated with the turning off more circuit elements the audio controller 145, the DSP 150 and/or the audio interface 140) may be associated with higher latency. In some examples, the audio hardware layer latency characteristics associated with the audio controller 145, the DSP 150 and/or the audio interface 140 may also specify limits (e.g., lower limits) on time periods in which given ones of the low power modes supported by the audio controller 145, the DSP 150 and/or the audio interface 140 are required to be active before transitioning to a different power mode and/or deactivating the given power mode. Other examples of the audio hardware layer latency characteristic(s) include, but are not limited to, embedded system constraints and limitations (e.g., real-time operating system (RTOS) firmware, data processing such as compression/decompression, buffering algorithm, etc), constraints from interface between the OS (e.g., drivers, applications, etc.) and firmware, constraints from hardware implementation (e.g., type of buffer, type of interface, speed and bandwidth of interface between audio controller to the audio capture, playback devices, etc.) etc.

In the illustrated example, the audio stack latency initializer 205 is also invoked (e.g., during power-up/boot of the compute device associated with the audio stack 100, when the capture device(s) 130 and/or playback device(s) 135 are initialized, when the audio function driver(s) 165 associated with the capture device(s) 130 and/or playback device(s) 135 is/are loaded, etc.) to read, from the audio device layer 110, one or more audio device layer latency characteristics associated with power mode transitions and to store the audio device layer latency characteristic(s) in the audio device layer latency characteristics storage 255. Additionally or alternatively, in some examples, the audio stack latency initializer 205 is invoked during an initialization procedure (e.g., performed during manufacturing, at power-up/boot of the compute device associated with the audio stack 100, etc.) to pre-store one or more of the audio device layer latency characteristic(s) in the audio device layer latency characteristics storage 255. For example, the audio stack latency initializer 205 may invoke a given one of the audio function drivers 165 to read, from the driver 165 and/or the associated capture device 130 itself, one or more latency characteristics associated with one or more low power modes supported by the given capture device 130 associated with that driver 165. Additionally or alternatively, in some examples, the audio stack latency initializer 205 may invoke a given one of the audio function drivers 165 to read, from the driver 165 and/or the associated playback device 135 itself, one or more latency characteristics associated with one or more low power modes supported by the given playback device 135 associated with that driver 165. In some examples, the audio device layer latency characteristics associated with the capture device(s) 130 and/or the playback device(s) 135 may specify one or more limits (e.g., upper limit(s)) on time period(s) associated with activating and deactivating different low power modes supported by the capture device(s) 130 and/or the playback device(s) 135, etc. For example, deeper low power modes (e.g., associated with the turning off more circuit elements the capture device(s) 130 and/or the playback device(s) 135) may be associated with higher latency. In some examples, the audio device layer latency characteristics associated with the capture device(s) 130 and/or the playback device(s) 135 may also specify limits (e.g., lower limits) on time periods in which given ones of the low power modes supported by the capture device(s) 130 and/or the playback device(s) 135 are required to be active before transitioning to a different power mode and/or deactivating the given power mode. Other examples of the audio device layer latency characteristic(s) include, but are not limited to, encoding/decoding process/implementation characteristics, digital-to-analog and/or analog-to-digital conversion characteristics, etc.

The application latency requirements storage 235, the OS latency requirements storage 240, the kernel software layer latency characteristics storage 245, the audio hardware layer latency characteristics storage 250 and the audio device layer latency characteristics storage 255 can be implemented by any number and/or types of storage devices, memories, etc. As such, in some examples, the application latency requirements storage 235, the OS latency requirements storage 240, the kernel software layer latency characteristics storage 245, the audio hardware layer latency characteristics storage 250 and the audio device layer latency characteristics storage 255 are implemented by separate storage devices, memories, etc. However, in some examples, a combination of two or more of the application latency requirements storage 235, the OS latency requirements storage 240, the kernel software layer latency characteristics storage 245, the audio hardware layer latency characteristics storage 250 and the audio device layer latency characteristics storage 255 are implemented by a same storage device, memory, etc. In some examples, one or more of the application latency requirements storage 235, the OS latency requirements storage 240, the kernel software layer latency characteristics storage 245, the audio hardware layer latency characteristics storage 250 and the audio device layer latency characteristics storage 255 is/are implemented by one or more of the local memory 613, the volatile memory 614, the non-volatile memory 616 and/or the mass storage device 628 included in the processor platform 600 of FIG. 6, which is described in further detail below.

In the illustrated example of FIG. 2, the audio stack latency analyzer 210 is invoked in response to detection of one or more audio silence events. Example of such audio silence events include, but are not limited to, a playback pause event, a playback stop event, a playback mute event, a capture mute event, a capture pause event, a capture stop event, etc. When invoked, the audio stack latency analyzer 210 accesses the application latency requirement(s) from the application latency requirements storage 235 and the OS latency requirement(s) from the OS latency requirements storage 240, which are collectively referred to herein as audio latency requirements. When invoked, the audio stack latency analyzer 210 also accesses the kernel software layer latency characteristics from the kernel software layer latency characteristics storage 245, the audio hardware layer latency characteristics from the audio hardware layer latency characteristics storage 250, and the audio device layer latency characteristics from the audio device layer latency characteristics storage 255, which are collectively referred to herein as audio latency characteristics. The audio stack latency analyzer 210 then compares one or more of audio latency characteristics with one or more of the audio latency requirements to determine whether the one or more of the audio latency requirements are met by (e.g., are less than or fall within, etc.) the one or more of audio latency characteristics. In some examples, the audio stack latency analyzer 210 determines which one(s) of the one or more of audio latency characteristics are able to meet the one or more of the audio latency requirements. Then, depending on which one(s) of the one or more of audio latency characteristics are able to meet the one or more of the audio latency requirements, the audio stack latency analyzer 210 selects which one or more low power modes supported by the different layers 110, 115, 120 and/or 125 of the audio stack 100 to activate in response to the audio silence event.

For example, the audio latency characteristics of the different layers 110, 115, 120 and 125 of the audio stack 100 tend to increase towards the lower layers of the stack 100. In other words, the audio latency characteristics of the kernel software layer 120 tend to be larger than the audio latency characteristics of the user software layer 125, the audio latency characteristics of the audio hardware layer 115 tend to be larger than the audio latency characteristics of the kernel software layer 120, and the audio latency characteristics of the audio device layer 110 tend to be larger than the audio latency characteristics of the audio hardware layer 115. Thus, in some such examples, the audio latency characteristics of the software layers 120/125 may be more likely to meet the audio latency requirements associated application(s) 170 and/or the OS audio engine 175 than the audio latency characteristics of the hardware layer 115 and the device layer 110.

In the illustrated example, if in response to an audio silence event, the audio stack latency analyzer 210 determines that one or more of the audio latency characteristics of the software layers 120 and/or 125 is/are able to meet the audio latency requirement(s) associated application(s) 170 and/or the OS audio engine 175, the audio stack latency analyzer 210 invokes the kernel software layer power controller 215 to activate one or more low power modes of the software layers 120 and/or 125 that is/are associated with the audio latency characteristics that meet the audio latency requirement(s). For example, the kernel software layer power controller 215 may utilize one or more of an API, library call, instruction, etc., to instruct the audio stream manager 180 to stop an audio stream associated with the audio silence event if the audio latency characteristic associated with stopping that audio stream meets the audio latency requirement(s).

Additionally or alternatively, if in response to an audio silence event, the audio stack latency analyzer 210 determines that one or more of the audio latency characteristics of the audio hardware layer 115 is/are able to meet the audio latency requirement(s) associated application(s) 170 and/or the OS audio engine 175, the audio stack latency analyzer 210 invokes the audio hardware layer power controller 220 to activate one or more low power modes of the audio hardware layer 115 that is/are associated with the audio latency characteristics that meet the audio latency requirement(s). For example, the audio hardware layer power controller 220 may utilize one or more of an API, library call, instruction, etc., to instruct the audio controller driver 155 to activate a low power mode of the audio controller 145 that has an audio latency characteristic that meets the audio latency requirement(s). Additionally or alternatively, the audio hardware layer power controller 220 may utilize one or more of an API, library call, instruction, etc., to instruct the audio DSP driver 160 to activate a low power mode of the DSP 150 that has an audio latency characteristic that meets the audio latency requirement(s). Additionally or alternatively, the audio hardware layer power controller 220 may utilize one or more of an API, library call, instruction, etc., to instruct the audio function driver(s) 165 to activate a low power mode of the audio interface 140 that has an audio latency characteristic that meets the audio latency requirement(s).

Additionally or alternatively, if in response to an audio silence event, the audio stack latency analyzer 210 determines that one or more of the audio latency characteristics of the audio device layer 110 is/are able to meet the audio latency requirement(s) associated application(s) 170 and/or the OS audio engine 175, the audio stack latency analyzer 210 invokes the audio device layer power controller 225 to activate one or more low power modes of the audio device layer 110 that is/are associated with the audio latency characteristics that meet the audio latency requirement(s). For example, the audio hardware layer power controller 220 may utilize one or more of an API, library call, instruction, etc., to instruct a given one of the audio function driver(s) 165 to activate a low power mode of a corresponding capture device 130 if that low power mode has an audio latency characteristic that meets the audio latency requirement(s). Additionally or alternatively, the audio hardware layer power controller 220 may utilize one or more of an API, library call, instruction, etc., to instruct a given one of the audio function driver(s) 165 to activate a low power mode of a corresponding playback device 135 if that low power mode has an audio latency characteristic that meets the audio latency requirement(s).

In some examples, the audio stack latency analyzer 210 also evaluates one or more operation conditions before determining that a given low power mode can be activated. For example, even if the audio stack latency analyzer 210 determines that one or more audio latency characteristic of the audio hardware layer 115 meet the audio latency requirement(s) associated application(s) 170 and/or the OS audio engine 175, the audio stack latency analyzer 210 may not invoke a low power mode of the audio hardware layer 115 if an operation condition for entry in that low power mode of the audio hardware layer 115 is not met. By way of example, one such operation condition may be such that the operation condition to be met when a reference audio stream (e.g., to provide comfort noise, to provide a timing reference for synchronization) is not required by the application(s) 170 or by the hardware layer 115 of the audio stack 100. In such an example, the audio stack latency analyzer 210 may activate a low power mode of the audio hardware layer 115 (e.g., such as a low power mode of the audio controller 145) if that operation condition is met (e.g., no reference audio stream is needed) and the latency characteristic(s) of the low power mode meet the audio latency requirement(s). However, the audio stack latency analyzer 210 may not activate that low power mode of the audio hardware layer 115 (e.g., such as the low power mode of the audio controller 145) if the operation condition is not met (e.g., a reference audio stream is needed), even if the latency characteristic(s) of the low power mode meet the audio latency requirement(s).

In the illustrated example of FIG. 2, the audio activity detector 230 detects one or more audio activity events to determine when one or more low power modes that have been activated by the audio policy manager 105 is/are to be deactivated (e.g., to enable audio processing to resume). In some examples, the audio activity event(s) is/are generated by commands input to the application(s) 170 (e.g., such as a play command, an unmute command, an unpause command, etc.). Additionally or alternatively, in some examples, the audio activity event(s) is/are generated by the activity detection circuitry 185 and/or the activity detection circuitry 190 included in the capture device(s) 130 and the playback device(s) 135, respectively. In some examples, the activity detection circuitry 185/190 includes circuitry structured to detect acoustic energy/power and trigger an audio activity event, such as an interrupt, when the detected acoustic energy/power meets an activity threshold. Such acoustic energy/power detection circuitry may operate at low power (e.g., when other low power mode(s) of the capture device(s) 130 and/or the playback device(s) 135 are active). In some examples, the activity detection circuitry 185/190 includes additional or alternative circuitry structured to perform voice activity detection and, in some examples, voice recognition, and may trigger an audio activity event when voice is detected, a particular speaker is recognized, etc. Such voice activity detection circuitry may operate at higher power than the acoustic energy/power detection circuitry.

In some examples, in response to detection of a voice activity event (e.g., in response to an interrupt generated by the activity detection circuitry 185/190), the audio activity detector 230 invokes the kernel software layer power controller 215 to deactivate one or more active low power modes of the software layers 120 and/or 125. For example, the kernel software layer power controller 215 may utilize one or more of an API, library call, instruction, etc., to instruct the audio stream manager 180 to start an audio stream associated with the audio activity event. Additionally or alternatively, in response to detection of a voice activity event, the audio activity detector 230 invokes the audio hardware layer power controller 220 to deactivate one or more active low power modes of the audio hardware layer 115. For example, the audio hardware layer power controller 220 may utilize one or more of an API, library call, instruction, etc., to instruct the audio controller driver 155 to deactivate a low power mode of the audio controller 145. Additionally or alternatively, the audio hardware layer power controller 220 may utilize one or more of an API, library call, instruction, etc., to instruct the audio DSP driver 160 to deactivate a low power mode of the DSP 150. Additionally or alternatively, the audio hardware layer power controller 220 may utilize one or more of an API, library call, instruction, etc., to instruct the audio function driver(s) 165 to deactivate a low power mode of the audio interface 140. Additionally or alternatively, in response to detection of a voice activity event, the audio activity detector 230 invokes the audio device layer power controller 225 to deactivate one or more active low power modes of the audio device layer 110. For example, the audio hardware layer power controller 220 may utilize one or more of an API, library call, instruction, etc., to instruct a given one of the audio function driver(s) 165 to deactivate a low power mode of a corresponding capture device 130. Additionally or alternatively, the audio hardware layer power controller 220 may utilize one or more of an API, library call, instruction, etc., to instruct a given one of the audio function driver(s) 165 to deactivate a low power mode of a corresponding playback device 135.

In the illustrated example audio policy manager 105 of FIG. 2, the audio stack latency initializer 205, the audio stack latency analyzer 210, the kernel software layer power controller 215, the audio hardware layer power controller 220, the audio device layer power controller 225 and the audio activity detector 230 are depicted as being implemented by the OS audio engine 175. However, in some examples, one or more of the audio stack latency initializer 205, the audio stack latency analyzer 210, the kernel software layer power controller 215, the audio hardware layer power controller 220, the audio device layer power controller 225 and/or the audio activity detector 230 may be implemented by hardware (e.g., circuitry), a combination of hardware (e.g., circuitry) and firmware, etc. In such examples, the audio stack latency initializer 205, the audio stack latency analyzer 210, the kernel software layer power controller 215, the audio hardware layer power controller 220, the audio device layer power controller 225 and/or the audio activity detector 230 are referred to as example audio stack latency initializer circuitry 205, example audio stack latency analyzer circuitry 210, example kernel software layer power controller circuitry 215, example audio hardware layer power controller circuitry 220, example audio device layer power controller 225 circuitry and/or example audio activity detector 230 circuitry, respectively. Operation of the audio policy manager 105 is described in further detail below in connection with the descriptions of FIGS. 3-5.

In some examples, the audio policy manager 105 includes means for initializing audio stack latency. For example, the means for initializing audio stack latency may be implemented by the audio stack latency initializer 205. In some examples, the audio stack latency initializer 205 may be implemented by machine executable instructions such as that implemented by one or more blocks of FIGS. 3-5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the audio stack latency initializer 205 is implemented by other hardware logic circuitry, hardware implemented state machines, and/or any other combination of hardware, software, and/or firmware. For example, the audio stack latency initializer 205 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio policy manager 105 includes means for analyzing audio stack latency. For example, the means for analyzing audio stack latency may be implemented by the audio stack latency analyzer 210. In some examples, the audio stack latency analyzer 210 may be implemented by machine executable instructions such as that implemented by one or more blocks FIG. 3-4 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the audio stack latency analyzer 210 is implemented by other hardware logic circuitry, hardware implemented state machines, and/or any other combination of hardware, software, and/or firmware. For example, the audio stack latency analyzer 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio policy manager 105 includes means for controlling kernel software layer power modes. For example, the means for controlling kernel software layer power modes may be implemented by the kernel software layer power controller 215. In some examples, the kernel software layer power controller 215 may be implemented by machine executable instructions such as that implemented by one or more blocks of FIGS. 3-5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the kernel software layer power controller 215 is implemented by other hardware logic circuitry, hardware implemented state machines, and/or any other combination of hardware, software, and/or firmware. For example, the kernel software layer power controller 215 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio policy manager 105 includes means for controlling audio hardware layer low power modes. For example, the means for controlling audio hardware layer low power modes may be implemented by the audio hardware layer power controller 220. In some examples, the audio hardware layer power controller 220 may be implemented by machine executable instructions such as that implemented by one or more blocks of FIGS. 3-5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the audio hardware layer power controller 220 is implemented by other hardware logic circuitry, hardware implemented state machines, and/or any other combination of hardware, software, and/or firmware. For example, the audio hardware layer power controller 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio policy manager 105 includes means for controlling audio device layer low power modes. For example, the means for controlling audio device layer low power modes may be implemented by the audio hardware layer power controller 220. In some examples, the audio device layer power controller 225 may be implemented by machine executable instructions such as that implemented by one or more blocks of FIGS. 3-5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the audio device layer power controller 225 is implemented by other hardware logic circuitry, hardware implemented state machines, and/or any other combination of hardware, software, and/or firmware. For example, the audio device layer power controller 225 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio policy manager 105 includes means for detecting audio activity. For example, the means for detecting audio activity may be implemented by the audio activity detector 230. In some examples, the audio activity detector 230 may be implemented by machine executable instructions such as that implemented by at one or more blocks of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the audio activity detector 230 is implemented by other hardware logic circuitry, hardware implemented state machines, and/or any other combination of hardware, software, and/or firmware. For example, the audio activity detector 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While example manners of implementing the audio stack 100 and the audio policy manager 105 are illustrated in FIGS. 1-2, one or more of the elements, processes, and/or devices illustrated in FIGS. 1-2 may be combined, divided, re-arranged, omitted, eliminated, and/or implemented in any other way. Further, the example audio device layer 110, the example audio hardware layer 115, the example kernel software layer 120, the example user software layer 125, the example audio capture device(s) 130, the example audio playback device(s) 135, the example audio interface 140, the example audio controller 145, the example DSP 150, the example audio controller driver 155, the example audio DSP driver 160, the example audio function driver(s) 165, the example application(s) 170, the example OS audio engine 175, the example audio stream manager 180, the example audio activity detection circuitry 185, the example audio activity detection circuitry 190, the example audio stack latency initializer 205, the example audio stack latency analyzer 210, the example kernel software layer power controller 215, the example audio hardware layer power controller 220, the example audio device layer power controller 225, the example audio activity detector 230, the example application latency requirements storage 235, the example OS latency requirements storage 240, the example kernel software layer latency characteristics storage 245, the example audio hardware layer latency characteristics storage 250, the example audio device layer latency characteristics storage 255 and/or, more generally, the example audio stack 100 and/or the example audio policy manager 105 of FIGS. 1-2 may be implemented by hardware, software, firmware, and/or any combination of hardware, software, and/or firmware. Thus, for example, any of the example audio device layer 110, the example audio hardware layer 115, the example kernel software layer 120, the example user software layer 125, the example audio capture device(s) 130, the example audio playback device(s) 135, the example audio interface 140, the example audio controller 145, the example DSP 150, the example audio controller driver 155, the example audio DSP driver 160, the example audio function driver(s) 165, the example application(s) 170, the example OS audio engine 175, the example audio stream manager 180, the example audio activity detection circuitry 185, the example audio activity detection circuitry 190, the example audio stack latency initializer 205, the example audio stack latency analyzer 210, the example kernel software layer power controller 215, the example audio hardware layer power controller 220, the example audio device layer power controller 225, the example audio activity detector 230, the example application latency requirements storage 235, the example OS latency requirements storage 240, the example kernel software layer latency characteristics storage 245, the example audio hardware layer latency characteristics storage 250, the example audio device layer latency characteristics storage 255 and/or, more generally, the example audio stack 100 and/or the example audio policy manager 105 could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)) such as Field Programmable Gate Arrays (FPGAs). When reading any of the apparatus or system claims of this patent to cover a purely software and/or firmware implementation, at least one of the example audio stack 100, the example audio policy manager 105, the example audio device layer 110, the example audio hardware layer 115, the example kernel software layer 120, the example user software layer 125, the example audio capture device(s) 130, the example audio playback device(s) 135, the example audio interface 140, the example audio controller 145, the example DSP 150, the example audio controller driver 155, the example audio DSP driver 160, the example audio function driver(s) 165, the example application(s) 170, the example OS audio engine 175, the example audio stream manager 180, the example audio activity detection circuitry 185, the example audio activity detection circuitry 190, the example audio stack latency initializer 205, the example audio stack latency analyzer 210, the example kernel software layer power controller 215, the example audio hardware layer power controller 220, the example audio device layer power controller 225, the example audio activity detector 230, the example application latency requirements storage 235, the example OS latency requirements storage 240, the example kernel software layer latency characteristics storage 245, the example audio hardware layer latency characteristics storage 250 and/or the example audio device layer latency characteristics storage 255 is/are hereby expressly defined to include a non-transitory computer readable storage device or storage disk such as a memory, a digital versatile disk (DVD), a compact disk (CD), a Blu-ray disk, etc., which includes (e.g., stores) the software and/or firmware. Further still, the example audio stack 100 and/or the example audio policy manager 105 may include one or more elements, processes and/or devices in addition to, or instead of, those illustrated in FIGS. 1-2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
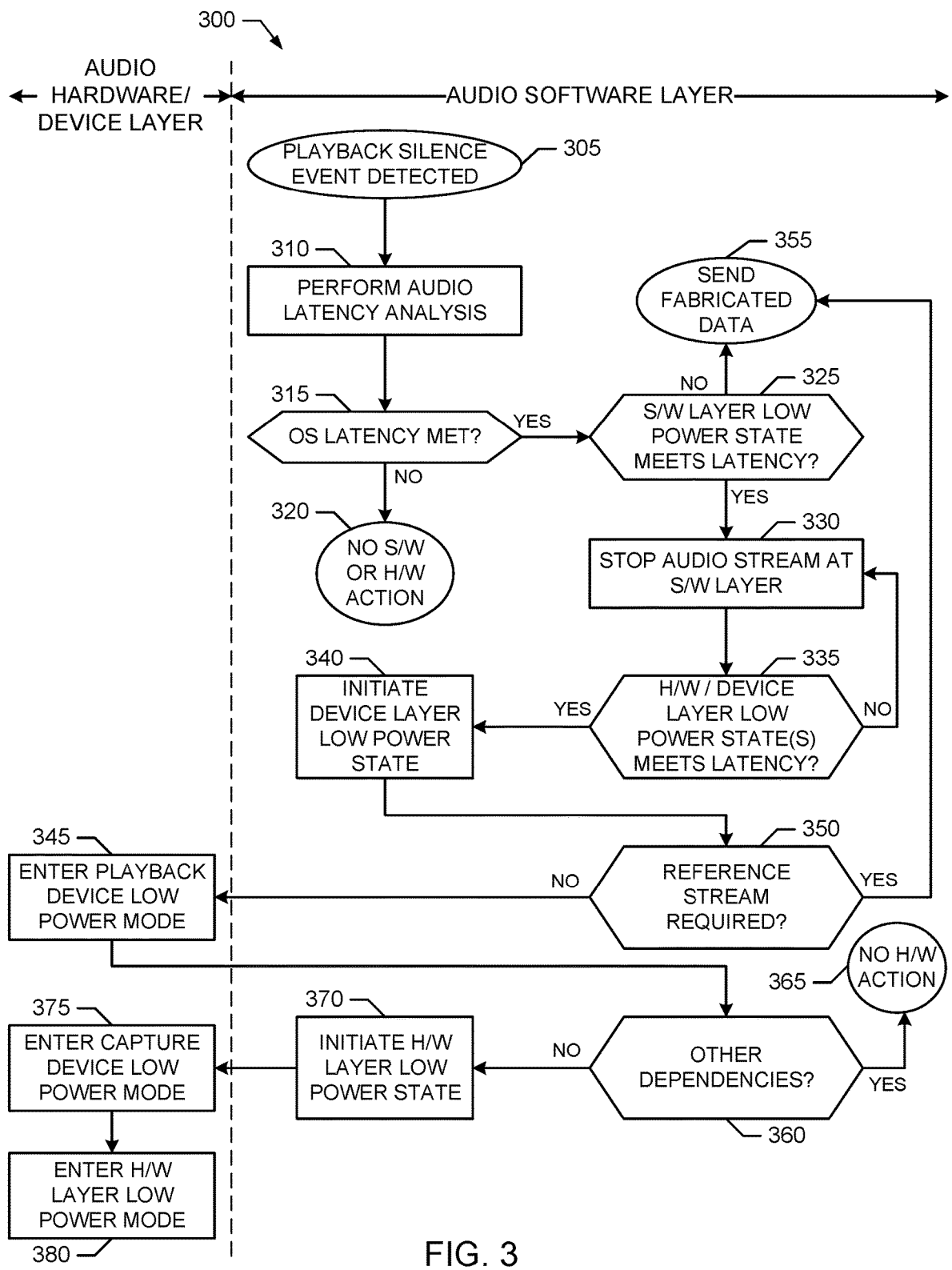
FIGS. 3-5 are flowcharts representative of example machine readable instructions that may be executed by example processor circuitry to implement the audio policy manager of FIGS. 1 and/or 2.
Figure 4:
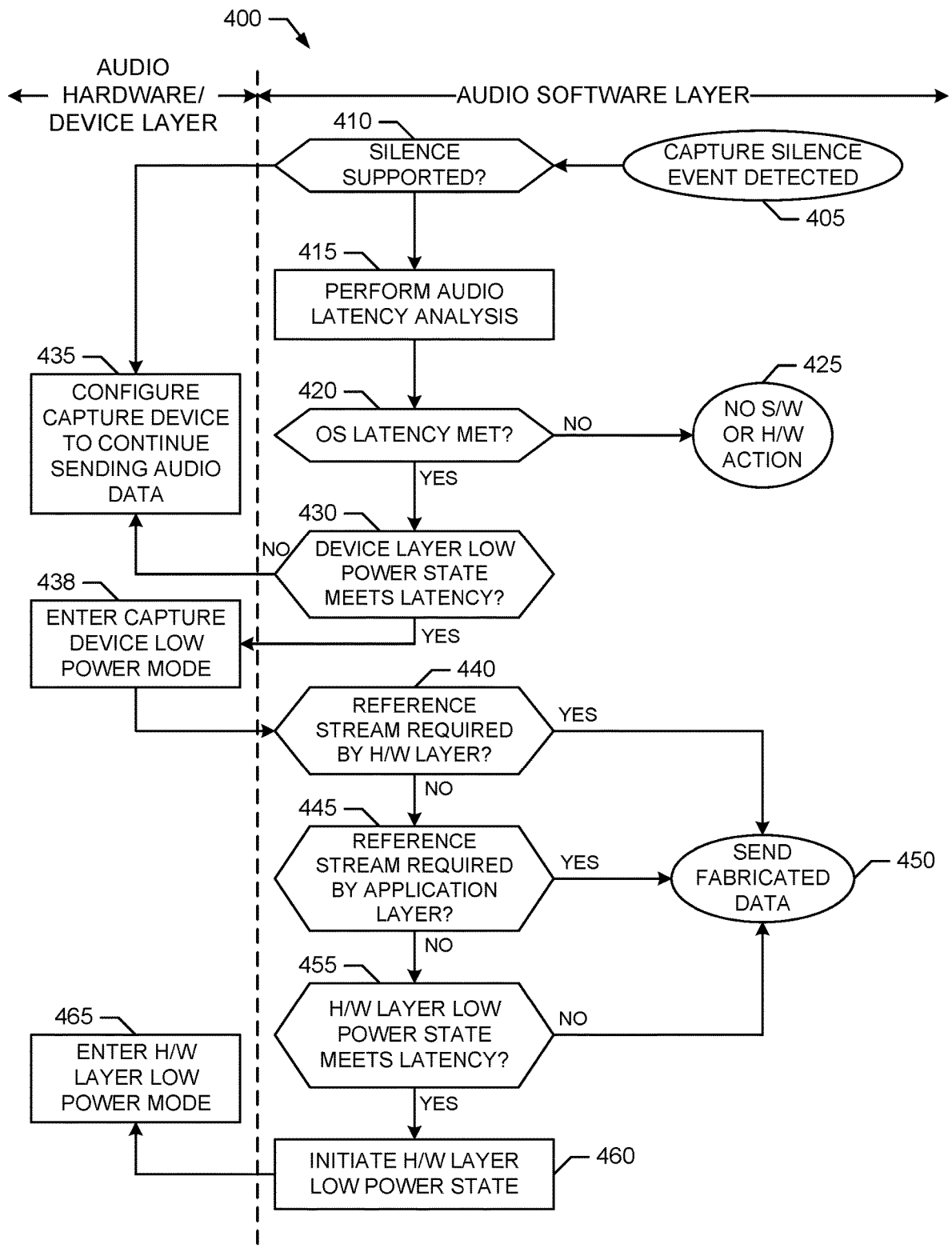
Figure 5:
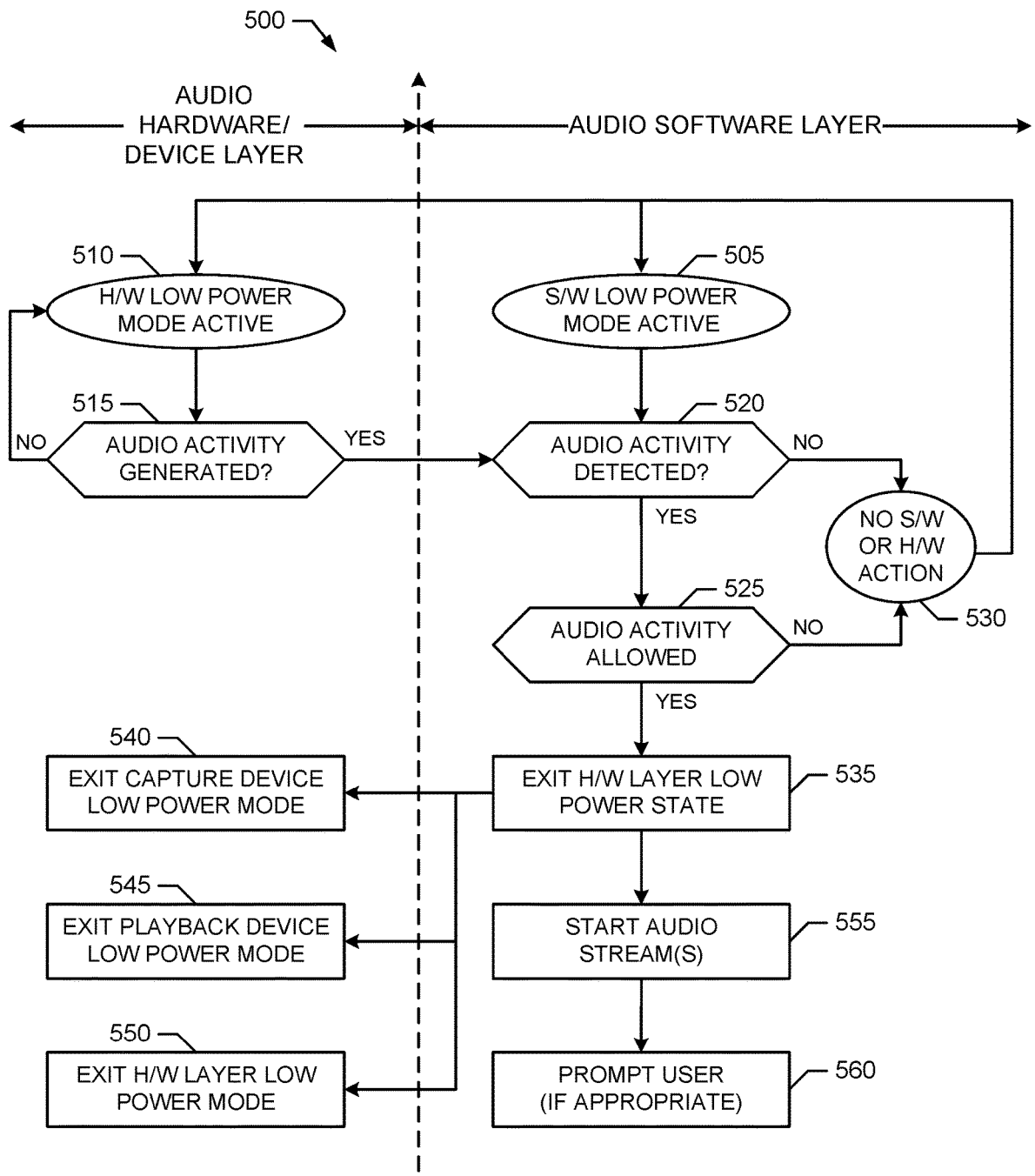

Flowcharts representative of example hardware logic circuitry, machine readable instructions, hardware implemented state machines, and/or any combination thereof for implementing the audio policy manager 105 are shown in FIGS. 3-5. In these examples, the machine readable instructions may be one or more executable programs or portion(s) of an executable program for execution by a computer processor and/or processor circuitry, such as the processor circuitry 612 shown in the example processor platform 600 discussed below in connection with FIG. 6 and/or the example processor circuitry discussed below in connection with FIGS. 7 and/or 8. The one or more programs, or portion(s) thereof, may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program or programs and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 3-5, many other methods of implementing the example audio policy manager 105 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of first example machine readable instructions and/or example operations 300 that may be executed and/or instantiated by processor circuitry to implement the audio policy manager 105. With reference to the preceding figures and associated written descriptions, the machine readable instructions and/or operations 300 of FIG. 3 begin at block 305, at which the audio stack latency analyzer 210 of the audio policy manager 105 detects an audio playback silence event (e.g., such as playback pause event, a playback stop event, an audio mute event, etc.) generated by an application 170 in response to a user input, as described above. At block 310, the audio stack latency analyzer 210 performs an audio latency analysis by comparing the audio latency requirement(s) of the application 170 and/or the OS of the compute device implementing the audio stack 100 with the audio latency characteristic(s) associated with the available low power mode(s) of the kernel software layer 120, the audio hardware layer 115 and/or the audio device layer 110 of the audio stack 100, as described above. At block 315, the audio stack latency analyzer 210 determines whether the audio latency requirements(s) associated with the OS are met by any of the audio latency characteristic(s) associated with the available low power mode(s). If the audio latency requirements(s) associated with OS are not met (block 315), then at block 320 the audio stack latency analyzer 210 determines that no low power modes are to be activated in response to the audio playback silence event.

However, if the audio latency requirements(s) associated with the OS are met (block 315), then at block 325 the audio stack latency analyzer 210 determines whether any of the audio latency characteristic(s) associated with the available low power mode(s) of the kernel software layer 120 of the audio stack 100 meet the audio latency requirements(s) associated with the application 170, as described above. If the audio latency requirements(s) associated with the application 170 are met (block 325), then at block 330 the audio stack latency analyzer 210 invokes the kernel software layer power controller 215 of the audio policy manager 105 to instruct the audio stream manager 180 of the kernel software layer 120 to stop the audio stream(s) associated with the audio playback silence event, as described above.

Next, at block 335, the audio stack latency analyzer 210 determines whether any of the audio latency characteristic(s) associated with the available low power mode(s) of the audio hardware layer 115 and the audio device layer 110 of the audio stack 100 meet the audio latency requirements(s) associated with the application 170, as described above. For example, at block 335, the audio stack latency analyzer 210 may determine whether the low power mode(s) supported by the audio playback device 135 associated with the audio playback silence event have associated audio latency characteristic(s) that meet the audio latency requirements(s) associated with the application 170.

However, in the illustrated example, before invoking the audio device layer power controller 225, at block 350, the audio stack latency analyzer 210 determines whether a reference audio stream is required during the time period (e.g., duration) of the audio playback silence event, as described above. For example, the application 170 and/or the hardware layer 115 of the audio stack 100 may require a reference audio stream to provide comfort noise or zeroed audio samples (e.g., for an audio conferencing application), a timing reference (e.g., to maintain synchronization among multiple different data streams including the audio data stream associated with the audio playback silence event, to maintain synchronization of features implemented by the audio hardware layer 115, etc.), etc. If a reference audio stream is required (block 350), or if the audio latency characteristic(s) associated with the available low power mode(s) of the kernel software layer 120 of the audio stack 100 do not meet the audio latency requirements(s) associated with the application 170 (block 325), then at block 355, the audio stack latency analyzer 210 causes the reference audio stream to be generated, as described above. For example, at block 355, the audio stack latency analyzer 210 may invoke the audio hardware layer power controller 220 to instruct the audio controller 145 to generate the reference audio stream and provide it to the other layers of the audio stack 100.

However, if a reference audio stream is not required (block 350), the audio stack latency analyzer 210 invokes the audio device layer power controller 225 of the audio policy manager 105 to instruct the audio device layer 110 of the audio stack 100 to activate the appropriate low power mode having audio latency characteristic(s) that meet the audio latency requirements(s) associated with the application 170, as described above. For example, the audio stack latency analyzer 210 may invoke the audio device layer power controller 225 to instruct the audio playback device 135 associated with the audio playback silence event to activate the appropriate low power mode having audio latency characteristic(s) that meet the audio latency requirements(s) associated with the application 170. As a result, at block 345, the audio playback device 135 associated with the audio playback silence event enters the activated low power mode.

After the audio playback device 135 associated with the audio playback silence event enters the activated low power mode (block 345), at block 360 the audio stack latency analyzer 210 determines whether there are any other dependencies that may prevent activation of other low power modes having audio latency characteristic(s) that meet the audio latency requirements(s) associated with the application 170. For example, the application 170 that generated the playback audio silence event may still be processing captured audio data from an audio capture device 130. As another example, other executing applications 170 may be accessing others of the capture device(s) 130 and/or playback device(s) 135. If other dependencies are present (block 360), then at block 365, the audio stack latency analyzer 210 determines that no other low power mode(s) are to be activated at the hardware layer 115 and device layer of the audio stack 100. However, if other dependencies are not present (block 360), then at block 370, invokes the audio device layer power controller 225 and the audio hardware layer power controller 220 of the audio policy manager 105 to instruct the audio device layer 110 and the audio hardware layer 115 of the audio stack 100 to activate the appropriate low power mode(s) having audio latency characteristic(s) that meet the audio latency requirements(s) associated with the application 170, as described above. For example, at block 370, the audio stack latency analyzer 210 may invoke the audio device layer power controller 225 to instruct an audio capture device 135 associated with the application 170 to activate an appropriate low power mode having audio latency characteristic(s) that meet the audio latency requirements(s) associated with the application 170. At block 370, the audio stack latency analyzer 210 may also invoke the audio hardware layer power controller 220 to instruct the audio controller 145 and/or the audio interface 140 to activate appropriate low power mode(s) having audio latency characteristic(s) that meet the audio latency requirements(s) associated with the application 170. As a result, at block 370, the audio capture device 130 associated with the application 170 enters its activated low power mode, and at block 380, the audio controller 145 and/or the audio interface 140 (or, more generally, the audio hardware layer 115) enter(s) the activated low power mode(s).

FIG. 4 is a flowchart representative of second example machine readable instructions and/or example operations 400 that may be executed and/or instantiated by processor circuitry to implement the audio policy manager 105. With reference to the preceding figures and associated written descriptions, the machine readable instructions and/or operations 400 of FIG. 4 begin at block 405, at which the at which the audio stack latency analyzer 210 of the audio policy manager 105 detects an audio capture silence event (e.g., such as a capture pause event, a capture stop event, an audio mute event, etc.) generated by an application 170 in response to a user input, as described above. At block 410, the audio stack latency analyzer 210 determines whether low power operation during audio capture silence events is supported. If low power operation during audio capture silence events is supported (block 410), then at block 415, the audio stack latency analyzer 210 performs an audio latency analysis by comparing the audio latency requirement(s) of the application 170 and/or the OS of the compute device implementing the audio stack 100 with the audio latency characteristic(s) associated with the available low power mode(s) of the kernel software layer 120, the audio hardware layer 115 and/or the audio device layer 110 of the audio stack 100, as described above. At block 420, the audio stack latency analyzer 210 determines whether the audio latency requirements(s) associated with the OS are met by any of the audio latency characteristic(s) associated with the available low power mode(s). If the audio latency requirements(s) associated with OS are not met (block 420), then at block 425 the audio stack latency analyzer 210 determines that no low power modes are to be activated in response to the audio playback silence event.

However, if the audio latency requirements(s) associated with the OS are met (block 420), then at block 430 the audio stack latency analyzer 210 determines whether any of the audio latency characteristic(s) associated with the available low power mode(s) of the audio device layer 110 of the audio stack 100 meet the audio latency requirements(s) associated with the application 170, as described above. For example, at block 430, the audio stack latency analyzer 210 determines whether any of the available low power mode(s) of the audio capture device 130 associated with the audio capture silence event have audio latency characteristic(s) that meet the audio latency requirements(s) associated with the application 170. If the audio latency requirements(s) associated with the application 170 are not met (block 430), or if low power operation during audio capture silence events is not supported (block 410), then at block 435, the audio stack latency analyzer 210 invokes the audio device layer power controller 225 of the audio policy manager 105 to instruct the audio capture device 130 associated with the audio capture silence event to continue sending audio data.

However, if the audio latency requirements(s) associated with the application 170 can be met (block 430), then at block 438, the audio stack latency analyzer 210 invokes the audio device layer power controller 225 of the audio policy manager 105 to instruct the audio device layer 110 of the audio stack 100 to activate the appropriate low power mode having audio latency characteristic(s) that meet the audio latency requirements(s) associated with the application 170, as described above. For example, at block 438, the audio stack latency analyzer 210 may invoke the audio device layer power controller 225 to instruct the audio capture device 130 associated with the audio capture silence event to activate the appropriate low power mode having audio latency characteristic(s) that meet the audio latency requirements(s) associated with the application 170. As a result, at block 438, the audio capture device 130 associated with the audio playback silence event enters the activated low power mode.

Next, at block 440, the audio stack latency analyzer 210 determines whether a reference audio stream is required by the hardware layer 115 of the audio stack 100 during the time period (e.g., duration) of the audio capture silence event, and at block 445, the audio stack latency analyzer 210 determines whether a reference audio stream is required by the application 170 during the time period (e.g., duration) of the audio capture silence event, as described above. For example, the application 170 and/or the hardware layer 115 of the audio stack 100 may require a reference audio stream to provide comfort noise or zeroed audio samples (e.g., for an audio conferencing application), a timing reference (e.g., to maintain synchronization among multiple different data streams including the audio data stream associated with the audio playback silence event, to maintain synchronization of features implemented by the audio hardware layer 115, etc.), etc. If a reference audio stream is required (blocks 440 or 445), then at block 450, the audio stack latency analyzer 210 causes the reference audio stream to be generated, as described above. For example, at block 450, the audio stack latency analyzer 210 may invoke the audio hardware layer power controller 220 to instruct the audio controller 145 to generate the reference audio stream and provide it to the other layers of the audio stack 100.

However, if a reference audio stream is not required (blocks 440 and 445), at block 455, the audio stack latency analyzer 210 determines whether any of the audio latency characteristic(s) associated with the available low power mode(s) of the audio hardware layer 115 of the audio stack 100 meet the audio latency requirements(s) associated with the application 170, as described above. For example, at block 455, the audio stack latency analyzer 210 may determine whether the low power mode(s) supported by the audio controller 145 and/or the audio interface 140 have associated audio latency characteristic(s) that meet the audio latency requirements(s) associated with the application 170. If the audio latency requirements(s) associated with the application 170 cannot be met (block 455), processing proceeds to block 450, which is described above. However, if the audio latency requirements(s) associated with the application 170 can be met (block 455), then at block 460, the audio stack latency analyzer 210 invokes the audio hardware layer power controller 220 of the audio policy manager 105 to instruct the audio hardware layer 115 of the audio stack 100 to activate the appropriate low power mode having audio latency characteristic(s) that meet the audio latency requirements(s) associated with the application 170, as described above. For example, at block 460, the audio stack latency analyzer 210 may invoke the audio hardware layer power controller 220 to instruct the audio controller 145 and/or the audio interface 140 to activate the appropriate low power mode(s) having audio latency characteristic(s) that meet the audio latency requirements(s) associated with the application 170. As a result, at block 465, the audio hardware layer 115 (e.g., the audio controller 145 and/or the audio interface 140) enters the activated low power mode(s).

FIG. 5 is a flowchart representative of third example machine readable instructions and/or example operations 500 that may be executed and/or instantiated by processor circuitry to implement the audio policy manager 105. With reference to the preceding figures and associated written descriptions, the machine readable instructions and/or operations 500 of FIG. 5 begin with the kernel software layer 120 of the audio stack 100 in an active low power mode (block 505), and the audio hardware layer 115 and the audio device layer 110 of the audio stack 100 in active low power mode(s) (block 510). Next, at block 515, the audio activity detection circuitry 185 of a capture device 130 and/or the audio activity detection circuitry 190 of a playback device 135 determine(s) whether an audio activity event is to be generated, as described above. If an audio activity event is to be generated (block 515), then at block 520, the audio activity detector 230 of the audio policy manager 105 determines whether an audio activity event has been detected. If the audio activity detector 230 detects the audio activity event (block 520), then at block 525, the audio activity detector 230 determines whether the audio stack 100 is permitted to enable audio activity. For example, the compute device associated with the audio stack 100 may be in a low power state that is not presently configured to wake upon a detected audio activity event. If audio activity is not allowed (block 525), or if an audio activity event is not detected (block 520), then at block 530, the audio activity detector 230 does not perform any action to exit the active low power modes of the kernel software layer 120, the audio hardware layer 115 and the audio device layer 110 of the audio stack 100.

However, if audio activity is allowed (block 525), then at block 535, the audio activity detector 230 invokes the audio device layer power controller 225 of the audio policy manager 105 to deactivate the active low power mode(s) of the audio device layer 110, as described above. For example, the audio activity detector 230 may invoke the audio device layer power controller 225 to deactivate an active low power mode of a capture device 130 and/or to deactivate an active low power mode of a playback device 135. At block 535, the audio activity detector 230 also invokes the audio hardware layer power controller 220 of the audio policy manager 105 to deactivate one or more active low power modes of the audio hardware layer 115, as described above. For example, the audio activity detector 230 may invoke the audio hardware layer power controller 220 to deactivate an active low power mode of the audio controller 145 and/or to deactivate an active low power mode of the audio interface 140. As a result, the capture device 130 exits its low power mode at block 540, the playback device 135 exits its low power mode at block 545, and the audio hardware layer 115 exits its low power mode(s) at block 550.

Next, at block 555, the audio activity detector 230 invokes the kernel software layer power controller 215 to deactivate one or more active low power modes of the software layers 120 and/or 125, as described above. For example, at block 555, the audio activity detector 230 invokes the kernel software layer power controller 215 to instruct the audio stream manager 180 to start an audio stream associated with the detected audio activity event. Next, at block 560, the audio activity detector 230 instructs (e.g., triggers) the application 170 associated with the detected audio activity event to generate a user prompt in response to the detected audio activity event. For example, the user prompt in may indicate that audio activity has been detected, but the user is required to take some action (e.g., press an unmute button) for the application 170 to process audio data associated with the detected audio activity event.

Figure 6:
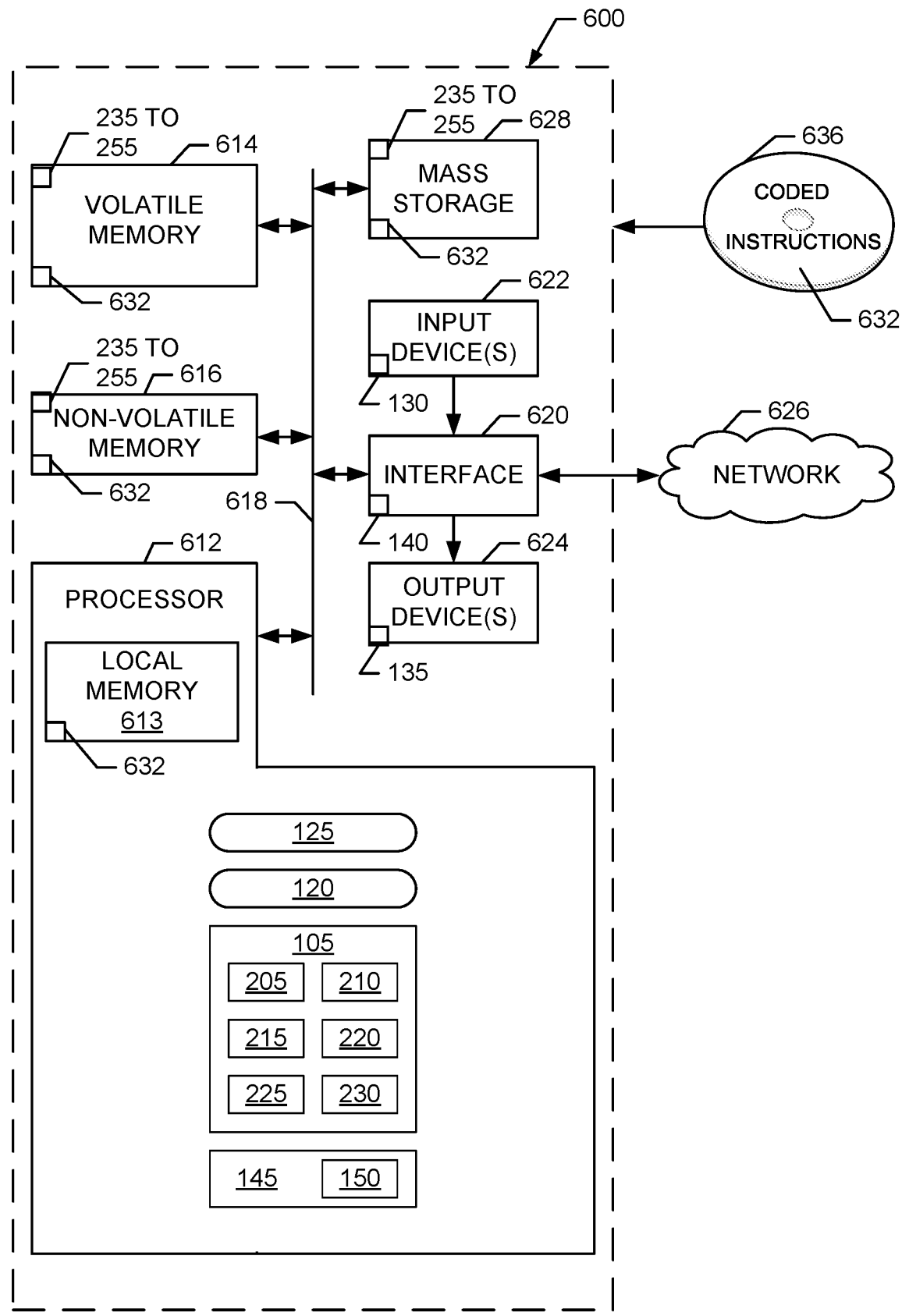
FIG. 6 is a block diagram of an example processor platform including processor circuitry structured to execute the example machine readable instructions of FIGS. 3, 4 and/or 5 to implement the example audio policy manager of FIGS. 1 and/or 2.

FIG. 6 is a block diagram of an example processor platform 600 structured to execute and/or instantiate the machine readable instructions and/or operations of FIGS. 3, 4 and/or 5 to implement the audio policy manager 105 of FIGS. 1-2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor 612 may be a semiconductor based (e.g., silicon based) device. In this example, the processor 612 implements the software layers 120 and 125, including the audio policy manager 105, the example audio stack latency initializer 205, the example audio stack latency analyzer 210, the example kernel software layer power controller 215, the example audio hardware layer power controller 220, the example audio device layer power controller 225, the example audio activity detector 230, as well as the audio controller 145 and the DSP 150.

The processor 612 of the illustrated example includes a local memory 613 (e.g., a cache, registers, etc.). The processor circuitry 612 of the illustrated example is in communication with a main memory including a volatile memory 614 and a non-volatile memory 616 via a link 618. The link 618 may be implemented by a bus, one or more point-to-point connections, etc., or a combination thereof. The volatile memory 614 may be implemented by Synchronous Dynamic Random Access Memory (SDRAM), Dynamic Random Access Memory (DRAM), RAIVIBUS® Dynamic Random Access Memory (RDRAM®) and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) can be implemented by, for example, an audio sensor, a microphone, a camera (still or video), a keyboard, a button, a mouse, a touchscreen, a track-pad, a trackball, a trackbar (such as an isopoint device), a voice recognition system and/or any other human-machine interface. Also, many systems, such as the processor platform 600, can allow the user to control the computer system and provide data to the computer using physical gestures, such as, but not limited to, hand or body movements, facial expressions, and face recognition. In the illustrated example, the one or more input devices 622 include the example capture device(s) 130.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speakers(s). The interface circuitry 620 of the illustrated example, thus, typically includes a graphics driver card, a graphics driver chip and/or graphics processor circuitry such as a GPU. In the illustrated example, the one or more output devices 624 include the example playback device(s) 135.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be via, for example, an Ethernet connection, a digital subscriber line (DSL) connection, a telephone line connection, a coaxial cable system, a satellite system, a line-of-site wireless system, a cellular telephone system, an optical connection, etc. In the illustrated example, the interface circuitry 620 includes the audio interface 140.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives. In some examples, the mass storage device 630 may implement the example application latency requirements storage 235, the example OS latency requirements storage 240, the example kernel software layer latency characteristics storage 245, the example audio hardware layer latency characteristics storage 250, and/or the example audio device layer latency characteristics storage 255. Additionally or alternatively, in some examples the volatile memory 618 may implement the mass storage device 630 may implement the example application latency requirements storage 235, the example OS latency requirements storage 240, the example kernel software layer latency characteristics storage 245, the example audio hardware layer latency characteristics storage 250, and/or the example audio device layer latency characteristics storage 255.

The machine executable instructions 632 which may be implemented by the machine readable instructions of FIGS. 3-5 may be stored in the mass storage device 628, in the volatile memory 614, in the non-volatile memory 616, in the local memory 613 and/or on a removable non-transitory computer readable storage medium, such as a CD or DVD 636.

Figure 7:
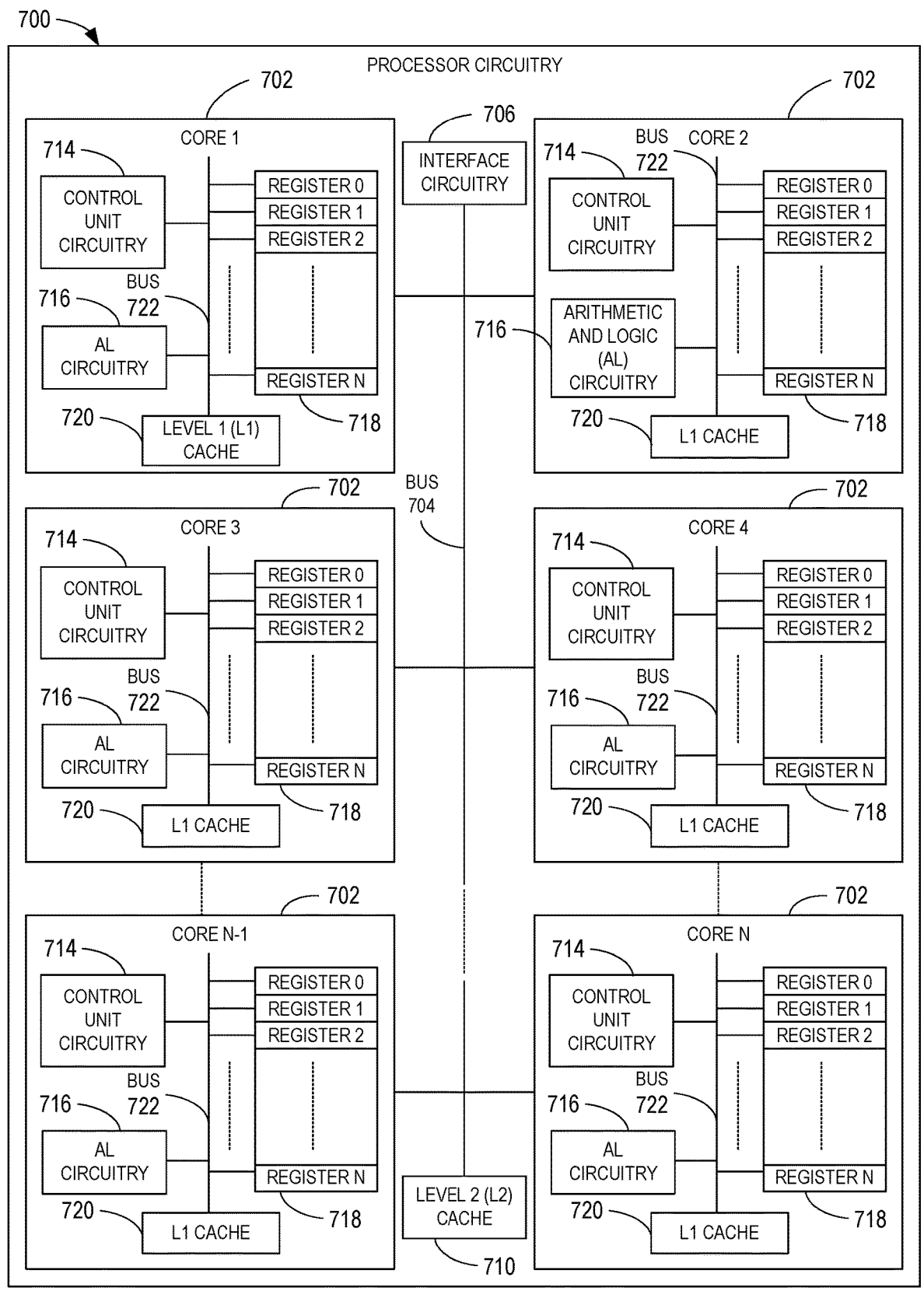
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIG. 3-5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 720 may implement at least one of an I2C bus, a SPI bus, a PCI bus, or a PCIe bus.

Figure 8:
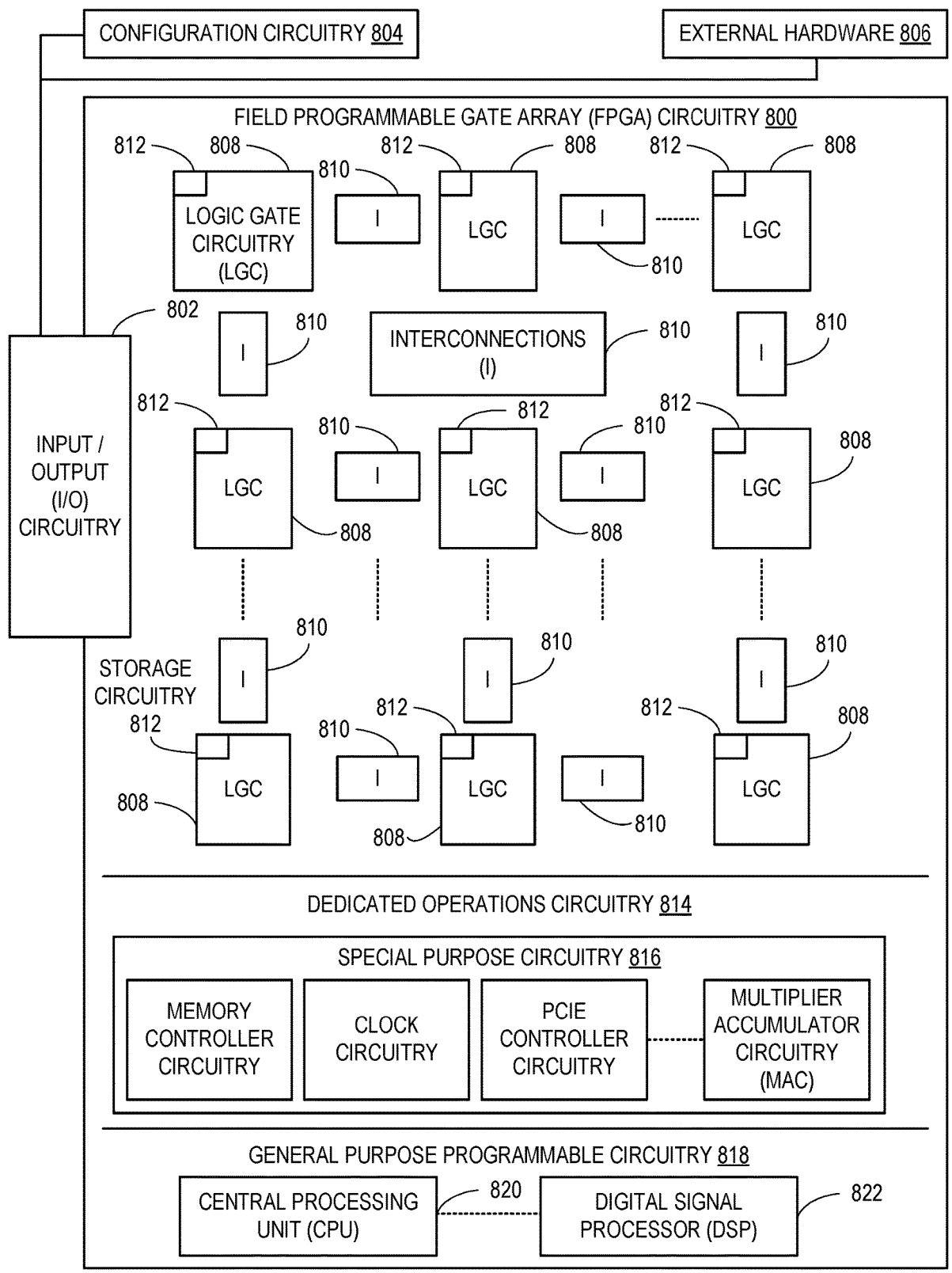
FIG. 8 is a block diagram of another example implementation of the processor circuitry of FIG. 6.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIGS. 3-5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3-5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3-5. As such, the FPGA circuitry 800 may be structured to effectively instantiate some or all of the machine readable instructions of the flowcharts of FIGS. 3-5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3-5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIGS. 3-5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3-5 may be executed by one or more of the cores 702 of FIG. 7 and a second portion of the machine readable instructions represented by the flowcharts of FIGS. 3-5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
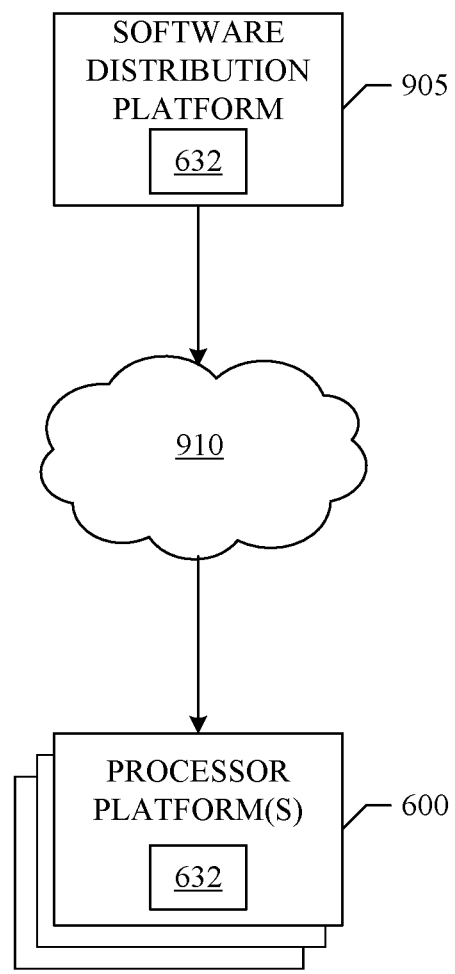
FIG. 9 is a block diagram of an example software distribution platform (e.g., one or more servers) to distribute software (e.g., software corresponding to the example machine readable instructions of FIGS. 3, 4 and/or 5) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 300, 400 and/or 500 of FIGS. 3-5, as described above. The one or more servers of the example software distribution platform 905 are in communication with a network 910, which may correspond to any one or more of the Internet and/or the example network 626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 300, 400 and/or 500 of FIGS. 3-5, may be downloaded to the example processor platform 600, which is to execute the machine readable instructions 632 to implement the audio policy manager 105 and/or, more generally, the audio stack 100. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that audio stack power control based on latency. The disclosed systems, methods, apparatus, and articles of manufacture improve the efficiency of using a computing device by comparing latency requirement(s) associated with audio application(s) and OS features executing in a user software layer of an audio stack with latency characteristic(s) associated with the low power modes provided by the audio hardware and audio device layers of the audio stack to determine whether one or more low power mode(s) can be entered during an audio silence period and, if so, which low power mode(s) to activate. The disclosed systems, methods, apparatus, and articles of manufacture also detect audio activity events, which may be generated by the audio hardware layer and/or audio device layer of the audio stack, to efficiently exit the active low power mode(s) and resume normal operation. As such, the disclosed systems, methods, apparatus, and articles of manufacture achieve potentially substantial power savings relative to prior audio stack implementations and, thus, are directed to one or more improvement(s) in the operation of a machine such as a computer or other electronic and/or mechanical device.

Example methods, apparatus, systems, and articles of manufacture to implement audio stack power control based on latency are disclosed herein. Further examples and combinations thereof include the following:

Example 1 includes an apparatus to perform audio stack power control, the apparatus comprising at least one memory, instructions in the apparatus, and processor circuitry to execute the instructions to at least compare one or more audio latency characteristics with one or more audio latency requirements in response to detection of an audio silence event, the one or more audio latency characteristics associated with at least one of a hardware layer or a device layer of an audio stack of a compute device, the one or more audio latency requirements associated with an application, control a device layer of the audio stack to enter a device layer low power mode in response to a first determination that the one or more audio latency requirements are met by the one or more audio latency characteristics, and control a hardware layer of the audio stack to enter a hardware layer low power mode in response to the first determination and a second determination that an operation condition for entry into the hardware layer low power mode is met.

Example 2 includes the apparatus of example 1, wherein the one or more audio latency characteristics are a first one or more audio latency characteristics, and the processor circuitry is to compare a second one or more audio latency characteristics with the one or more audio latency requirements in response to the detection of the audio silence event, the second one or more audio latency characteristics associated with a software layer of the audio stack, and control the software layer of the audio stack to stop an audio stream associated with the audio silence event in response to a third determination that the one or more audio latency requirements are met by the second one or more audio latency characteristics.

Example 3 includes the apparatus of example 1, wherein the audio silence event corresponds to a playback silence event, the device layer includes an audio playback device, the device layer low power mode corresponds to a low power mode of the audio playback device, the hardware layer includes an audio controller, the hardware layer low power mode corresponds to a low power mode of the audio controller, and the processor circuitry is to control the audio playback device to enter the low power mode of the audio playback device in response to the first determination that the one or more audio latency requirements are met by the one or more audio latency characteristics, and control the audio controller to enter the low power mode of the audio controller in response to the first determination and the second determination that the operation condition is met, the operation condition to be met when a reference audio stream is not required by the application.

Example 4 includes the apparatus of example 3, wherein the processor circuitry is to control the audio playback device to enter the low power mode of the audio playback device in response to the first determination that the one or more audio latency requirements are met by the one or more audio latency characteristics, and control the audio controller to generate fabricated audio data to include in the reference audio stream when the reference audio stream is required by the application.

Example 5 includes the apparatus of example 1, wherein the audio silence event corresponds to a capture silence event, the device layer includes an audio capture device, the device layer low power mode corresponds to a low power mode of the audio capture device, the hardware layer includes an audio controller, the hardware layer low power mode corresponds to a low power mode of the audio controller, and the processor circuitry is to control the audio capture device to enter the low power mode of the audio capture device in response to the first determination that the one or more audio latency requirements are met by the one or more audio latency characteristics, and control the audio controller to enter the low power mode of the audio controller in response to the first determination and the second determination that the operation condition is met, the operation condition to be met when a reference audio stream is not required by the application or by the hardware layer of the audio stack.

Example 6 includes the apparatus of example 5, wherein the processor circuitry is to control the audio capture device to enter the low power mode of the audio capture device in response to the first determination that the one or more audio latency requirements are met by the one or more audio latency characteristics, and control the audio controller to generate fabricated audio data to include in the reference audio stream when the reference audio stream is required by the application or by the hardware layer of the audio stack.

Example 7 includes the apparatus of any one of examples 1 to 6, wherein the processor circuitry is to detect an audio activity event after the device layer of the audio stack has entered the device layer low power mode and the hardware layer of the audio stack has entered the hardware layer low power mode, and in response to detection of the audio activity event, (i) control the device layer of the audio stack to exit the device layer low power mode and (ii) control the hardware layer of the audio stack to exit the hardware layer low power mode.

Example 8 includes the apparatus of example 7, wherein the audio activity event corresponds to an interrupt generated by the device layer of the audio stack.

Example 9 includes at least one non-transitory computer readable medium comprising computer readable instructions that, when executed, cause at least one processor to at least compare one or more audio latency characteristics with one or more audio latency requirements in response to detection of an audio silence event, the one or more audio latency characteristics associated with at least one of a hardware layer or a device layer of an audio stack of a compute device, the one or more audio latency requirements associated with an application, control a device layer of the audio stack to enter a device layer low power mode in response to a first determination that the one or more audio latency requirements are met by the one or more audio latency characteristics, and control a hardware layer of the audio stack to enter a hardware layer low power mode in response to the first determination and a second determination that an operation condition for entry into the hardware layer low power mode is met.

Example 10 includes the at least one non-transitory computer readable medium of example 9, wherein the one or more audio latency characteristics are a first one or more audio latency characteristics, and the instructions cause the at least one processor to compare a second one or more audio latency characteristics with the one or more audio latency requirements in response to the detection of the audio silence event, the second one or more audio latency characteristics associated with a software layer of the audio stack, and control the software layer of the audio stack to stop an audio stream associated with the audio silence event in response to a third determination that the one or more audio latency requirements are met by the second one or more audio latency characteristics.

Example 11 includes the at least one non-transitory computer readable medium of example 9, wherein the audio silence event corresponds to a playback silence event, the device layer includes an audio playback device, the device layer low power mode corresponds to a low power mode of the audio playback device, the hardware layer includes an audio controller, the hardware layer low power mode corresponds to a low power mode of the audio controller, and the instructions cause the at least one processor to control the audio playback device to enter the low power mode of the audio playback device in response to the first determination that the one or more audio latency requirements are met by the one or more audio latency characteristics, and control the audio controller to enter the low power mode of the audio controller in response to the first determination and the second determination that the operation condition is met, the operation condition to be met when a reference audio stream is not required by the application.

Example 12 includes the at least one non-transitory computer readable medium of example 11, wherein the instructions cause the at least one processor to control the audio playback device to enter the low power mode of the audio playback device in response to the first determination that the one or more audio latency requirements are met by the one or more audio latency characteristics, and control the audio controller to generate fabricated audio data to include in the reference audio stream when the reference audio stream is required by the application.

Example 13 includes the at least one non-transitory computer readable medium of example 9, wherein the audio silence event corresponds to a capture silence event, the device layer includes an audio capture device, the device layer low power mode corresponds to a low power mode of the audio capture device, the hardware layer includes an audio controller, the hardware layer low power mode corresponds to a low power mode of the audio controller, and the instructions cause the at least one processor to control the audio capture device to enter the low power mode of the audio capture device in response to the first determination that the one or more audio latency requirements are met by the one or more audio latency characteristics, and control the audio controller to enter the low power mode of the audio controller in response to the first determination and the second determination that the operation condition is met, the operation condition to be met when a reference audio stream is not required by the application or by the hardware layer of the audio stack.

Example 14 includes the at least one non-transitory computer readable medium of example 13, wherein the instructions cause the at least one processor to control the audio capture device to enter the low power mode of the audio capture device in response to the first determination that the one or more audio latency requirements are met by the one or more audio latency characteristics, and control the audio controller to generate fabricated audio data to include in the reference audio stream when the reference audio stream is required by the application or by the hardware layer of the audio stack.

Example 15 includes the at least one non-transitory computer readable medium of any one of examples 9 to 14, wherein the instructions cause the at least one processor to detect an audio activity event after the device layer of the audio stack has entered the device layer low power mode and the hardware layer of the audio stack has entered the hardware layer low power mode, and in response to detection of the audio activity event, (i) control the device layer of the audio stack to exit the device layer low power mode and (ii) control the hardware layer of the audio stack to exit the hardware layer low power mode.

Example 16 includes the at least one non-transitory computer readable medium of example 15, wherein the audio activity event corresponds to an interrupt generated by the device layer of the audio stack.

Example 17 includes a method to perform audio stack power control, the method comprising comparing, by executing an instruction with at least one processor, one or more audio latency characteristics with one or more audio latency requirements in response to detection of an audio silence event, the one or more audio latency characteristics associated with at least one of a hardware layer or a device layer of an audio stack of a compute device, the one or more audio latency requirements associated with an application, controlling, by executing an instruction with the at least one processor, a device layer of the audio stack to enter a device layer low power mode in response to a first determination that the one or more audio latency requirements are met by the one or more audio latency characteristics, and controlling, by executing an instruction with the at least one processor, a hardware layer of the audio stack to enter a hardware layer low power mode in response to the first determination and a second determination that an operation condition for entry into the hardware layer low power mode is met.

Example 18 includes the method of example 17, wherein the one or more audio latency characteristics are a first one or more audio latency characteristics, and further including comparing a second one or more audio latency characteristics with the one or more audio latency requirements in response to the detection of the audio silence event, the second one or more audio latency characteristics associated with a software layer of the audio stack, and controlling the software layer of the audio stack to stop an audio stream associated with the audio silence event in response to a third determination that the one or more audio latency requirements are met by the second one or more audio latency characteristics.

Example 19 includes the method of example 17, wherein the audio silence event corresponds to a playback silence event, the device layer includes an audio playback device, the device layer low power mode corresponds to a low power mode of the audio playback device, the hardware layer includes an audio controller, the hardware layer low power mode corresponds to a low power mode of the audio controller, and the controlling of the device layer of the audio stack includes controlling the audio playback device to enter the low power mode of the audio playback device in response to the first determination that the one or more audio latency requirements are met by the one or more audio latency characteristics, and the controlling of the hardware layer of the audio stack includes controlling the audio controller to enter the low power mode of the audio controller in response to the first determination and the second determination that the operation condition is met, the operation condition to be met when a reference audio stream is not required by the application.

Example 20 includes the method of example 19, and further includes controlling the audio controller to generate fabricated audio data to include in the reference audio stream when the reference audio stream is required by the application.

Example 21 includes the method of example 17, wherein the audio silence event corresponds to a capture silence event, the device layer includes an audio capture device, the device layer low power mode corresponds to a low power mode of the audio capture device, the hardware layer includes an audio controller, the hardware layer low power mode corresponds to a low power mode of the audio controller, and the controlling of the device layer of the audio stack includes controlling the audio capture device to enter the low power mode of the audio capture device in response to the first determination that the one or more audio latency requirements are met by the one or more audio latency characteristics, and the controlling of the hardware layer of the audio stack includes controlling the audio controller to enter the low power mode of the audio controller in response to the first determination and the second determination that the operation condition is met, the operation condition to be met when a reference audio stream is not required by the application or by the hardware layer of the audio stack.

Example 22 includes the method of example 21, and further includes controlling the audio controller to generate fabricated audio data to include in the reference audio stream when the reference audio stream is required by the application or by the hardware layer of the audio stack.

Example 23 includes the method of any one of examples 17 to 22, and further includes detecting an audio activity event after the device layer of the audio stack has entered the device layer low power mode and the hardware layer of the audio stack has entered the hardware layer low power mode, and in response to detecting the audio activity event, (i) controlling the device layer of the audio stack to exit the device layer low power mode and (ii) controlling the hardware layer of the audio stack to exit the hardware layer low power mode.

Example 24 includes the method of example 23, wherein the audio activity event corresponds to an interrupt generated by the device layer of the audio stack.

Example 25 includes a compute device comprising means for comparing one or more audio latency characteristics with one or more audio latency requirements in response to detection of an audio silence event, the one or more audio latency characteristics associated with at least one of a hardware layer or a device layer of an audio stack of a compute device, the one or more audio latency requirements associated with an application, means for controlling a device layer of the audio stack to enter a device layer low power mode in response to a first determination that the one or more audio latency requirements are met by the one or more audio latency characteristics, and means for controlling a hardware layer of the audio stack to enter a hardware layer low power mode in response to the first determination and a second determination that an operation condition for entry into the hardware layer low power mode is met.

Example 26 includes the apparatus of example 25, wherein the one or more audio latency characteristics are a first one or more audio latency characteristics, the means for controlling is to compare a second one or more audio latency characteristics with the one or more audio latency requirements in response to the detection of the audio silence event, the second one or more audio latency characteristics associated with a software layer of the audio stack, and further including means for controlling the software layer of the audio stack to stop an audio stream associated with the audio silence event in response to a third determination that the one or more audio latency requirements are met by the second one or more audio latency characteristics.

Example 27 includes the apparatus of example 25, wherein the audio silence event corresponds to a playback silence event, the device layer includes an audio playback device, the device layer low power mode corresponds to a low power mode of the audio playback device, the hardware layer includes an audio controller, the hardware layer low power mode corresponds to a low power mode of the audio controller, the means for controlling the device layer is to control the audio playback device to enter the low power mode of the audio playback device in response to the first determination that the one or more audio latency requirements are met by the one or more audio latency characteristics, and the means for controlling the hardware layer is to control the audio controller to enter the low power mode of the audio controller in response to the first determination and the second determination that the operation condition is met, the operation condition to be met when a reference audio stream is not required by the application.

Example 28 includes the apparatus of example 27, wherein the means for controlling the device layer is to control the audio playback device to enter the low power mode of the audio playback device in response to the first determination that the one or more audio latency requirements are met by the one or more audio latency characteristics, and the means for controlling the hardware layer is to control the audio controller to generate fabricated audio data to include in the reference audio stream when the reference audio stream is required by the application.

Example 29 includes the apparatus of example 25, wherein the audio silence event corresponds to a capture silence event, the device layer includes an audio capture device, the device layer low power mode corresponds to a low power mode of the audio capture device, the hardware layer includes an audio controller, the hardware layer low power mode corresponds to a low power mode of the audio controller, the means for controlling the device layer is to control the audio capture device to enter the low power mode of the audio capture device in response to the first determination that the one or more audio latency requirements are met by the one or more audio latency characteristics, and the means for controlling the hardware layer is to control the audio controller to enter the low power mode of the audio controller in response to the first determination and the second determination that the operation condition is met, the operation condition to be met when a reference audio stream is not required by the application or by the hardware layer of the audio stack.

Example 30 includes the apparatus of example 29, wherein the means for controlling the device layer is to control the audio capture device to enter the low power mode of the audio capture device in response to the first determination that the one or more audio latency requirements are met by the one or more audio latency characteristics, and the means for controlling the hardware layer is to control the audio controller to generate fabricated audio data to include in the reference audio stream when the reference audio stream is required by the application or by the hardware layer of the audio stack.

Example 31 includes the apparatus of any one of examples 25 to 30, and further includes means for detecting an audio activity event after the device layer of the audio stack has entered the device layer low power mode and the hardware layer of the audio stack has entered the hardware layer low power mode, and in response to detection of the audio activity event, (i) the means for controlling the device layer is to control the device layer of the audio stack to exit the device layer low power mode and (ii) the means for controlling the hardware layer it to control the hardware layer of the audio stack to exit the hardware layer low power mode.

Example 32 includes the apparatus of example 31, wherein the audio activity event corresponds to an interrupt generated by the device layer of the audio stack.

Although certain example systems, methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A compute device to perform audio stack power control, the compute device comprising:
    interface circuitry to interface with an audio device, the audio device including at least one of an amplifier or an equalizer;
    digital signal processor circuitry to perform one or more audio processing operations associated with the audio device;
    instructions; and
    at least one processor circuit to be programmed by the instructions to at least:
        detect an audio silence event;
        compare a first audio latency characteristic and a second audio latency characteristic with one or more audio latency requirements after detection of the audio silence event, the first audio latency characteristic associated with a first low power mode supported by the audio device, the first low power mode to cause the at least one of the amplifier or the equalizer of the audio device to be turned off, the second audio latency characteristic associated with a second low power mode supported by the digital signal processor circuitry of the compute device, the second low power mode to cause the digital signal processor circuitry to enter low power operation, the one or more audio latency requirements associated with an application on the compute device;
        control the audio device to enter the first low power mode after a determination that the one or more audio latency requirements are met by the first audio latency characteristic; and
        control the digital signal processor circuitry to enter the second low power mode after a determination that the one or more audio latency requirements are met by the second audio latency characteristic.

2. The compute device of claim 1, wherein one or more of the at least one processor circuit is to:
    compare a third audio latency characteristic with the one or more audio latency requirements after the detection of the audio silence event, the third audio latency characteristic associated with a software layer of the compute device; and
    control the software layer of the compute device to stop an audio stream associated with the audio silence event after a determination that the one or more audio latency requirements are met by the third audio latency characteristic.

3. The compute device of claim 1, wherein the audio silence event corresponds to a playback silence event, the audio device is an audio playback device, and one or more of the at least one processor circuit is to:
    control the digital signal processor circuitry to enter the second low power mode after the determination that the one or more audio latency requirements are met by the second audio latency characteristic and a determination that an operation condition is met, the operation condition to be met when a reference audio stream is not required by the application.

4. The compute device of claim 3, wherein one or more of the at least one processor circuit is to:
cause generation of fabricated audio data to include in the reference audio stream when the reference audio stream is required by the application.

5. The compute device of claim 1, wherein the audio silence event corresponds to a capture silence event, the audio device is an audio capture device, and one or more of the at least one processor circuit is to:
control the digital signal processor circuitry to enter the second low power mode after the determination that the one or more audio latency requirements are met by the second audio latency characteristic and a determination that an operation condition is met, the operation condition to be met when a reference audio stream is not required by the application.

6. The compute device of claim 5, wherein one or more of the at least one processor circuit is to:
cause generation of fabricated audio data to include in the reference audio stream when the reference audio stream is required by the application.

7. The compute device of claim 1, wherein one or more of the at least one processor circuit is to:
detect an audio activity event after the audio device has entered the first low power mode and the digital signal processor circuitry has entered the second low power mode; and
after detection of the audio activity event, (i) control the audio device to exit the first low power mode and (ii) control the digital signal processor circuitry to exit the second low power mode.

8. The compute device of claim 7, wherein the audio activity event corresponds to an interrupt generated by the audio device.

9. At least one non-transitory computer readable medium comprising computer readable instructions to cause at least one processor circuit of a compute device to at least:
detect an audio silence event;
compare a first audio latency characteristic and a second audio latency characteristic with one or more audio latency requirements after detection of the audio silence event, the first audio latency characteristic associated with a first low power mode supported by an audio device associated with the compute device, at least one of an amplifier or an equalizer of the audio device to be turned off in the first low power mode, the second audio latency characteristic associated with a second low power mode supported by digital signal processor circuitry of the compute device, the digital signal processor circuitry to enter low power operation in the second low power mode, the one or more audio latency requirements associated with an application on the compute device;
cause the audio device to enter the first low power mode after a determination that the one or more audio latency requirements are met by the first audio latency characteristic; and
cause the digital signal processor circuitry to enter the second low power mode after a determination that the one or more audio latency requirements are met by the second audio latency characteristic.

10. The at least one non-transitory computer readable medium of claim 9, wherein the instructions are to cause one or more of the at least one processor circuit to:
compare a third audio latency characteristic with the one or more audio latency requirements after the detection of the audio silence event, the third audio latency characteristic associated with a software layer of the compute device; and
cause the software layer of the compute device to stop an audio stream associated with the audio silence event after a determination that the one or more audio latency requirements are met by the third audio latency characteristic.

11. The at least one non-transitory computer readable medium of claim 9, wherein the audio silence event corresponds to a playback silence event, the audio device is an audio playback device, and the instructions are to cause one or more of the at least one processor circuit to:
cause the digital signal processor circuitry to enter the second low power mode after the determination that the one or more audio latency requirements are met by the second audio latency characteristic and a determination that an operation condition is met, the operation condition to be met when a reference audio stream is not required by the application.

12. The at least one non-transitory computer readable medium of claim 11, wherein the instructions are to cause one or more of the at least one processor circuit to:
cause generation of fabricated audio data to include in the reference audio stream when the reference audio stream is required by the application.

13. The at least one non-transitory computer readable medium of claim 9, wherein the audio silence event corresponds to a capture silence event, the audio device is an audio capture device, and the instructions are to cause one or more of the at least one processor circuit to:
cause the digital signal processor circuitry to enter the second low power mode after the determination that the one or more audio latency requirements are met by the second audio latency characteristic and a determination that an operation condition is met, the operation condition to be met when a reference audio stream is not required by the application.

14. The at least one non-transitory computer readable medium of claim 13, wherein the instructions are to cause one or more of the at least one processor circuit to:
cause generation of fabricated audio data to include in the reference audio stream when the reference audio stream is required by the application.

15. The at least one non-transitory computer readable medium of claim 9, wherein the instructions are to cause one or more of the at least one processor circuit to:
detect an audio activity event after the audio device has entered the first low power mode and the digital signal processor circuitry has entered the second low power mode; and
after detection of the audio activity event, (i) cause the audio device to exit the first low power mode and (ii) cause the digital signal processor circuitry to exit the second low power mode.

16. The at least one non-transitory computer readable medium of claim 15, wherein the audio activity event corresponds to an interrupt generated by the audio device.

17. A method to perform audio stack power control, the method comprising:
detecting an audio silence event;
comparing, by executing an instruction with at least one processor circuit, a first audio latency characteristic and a second audio latency characteristic with one or more audio latency requirements after detection of the audio silence event, the first audio latency characteristic associated with a first low power mode supported by an audio device associated with a compute device, at least one of an amplifier or an equalizer of the audio device to be turned off in the first low power mode, the second audio latency characteristic associated with a second low power mode supported by digital signal processor circuitry of the compute device, the digital signal processor circuitry to enter low power operation in the second low power mode, the one or more audio latency requirements associated with an application on the compute device;

controlling, by executing an instruction with one or more of the at least one processor circuit, the audio device to enter the first low power mode after a determination that the one or more audio latency requirements are met by the first audio latency characteristic; and controlling, by executing an instruction with one or more of the at least one processor circuit, the digital signal processor circuitry to enter the second low power mode after a determination that the one or more audio latency requirements are met by the second audio latency characteristic.

18. The method of claim 17, further including:
comparing a third audio latency characteristic with the one or more audio latency requirements after the detecting of the audio silence event, the third audio latency characteristic associated with a software layer of the compute device; and
controlling the software layer of the compute device to stop an audio stream associated with the audio silence event after a determination that the one or more audio latency requirements are met by the third audio latency characteristic.

19. The method of claim 17, wherein the audio silence event corresponds to a playback silence event, the audio device is an audio playback device, and:
the controlling of the digital signal processor circuitry includes controlling the digital signal processor circuitry to enter the second low power mode after the determination that the one or more audio latency requirements are met by the second audio latency characteristic and a determination that an operation condition is met, the operation condition to be met when a reference audio stream is not required by the application.

20. The method of claim 19, further including generating fabricated audio data to include in the reference audio stream when the reference audio stream is required by the application.

21. The method of claim 17, wherein the audio silence event corresponds to a capture silence event, the audio device is an audio capture device, and:
the controlling of the digital signal processor circuitry includes controlling the digital signal processor circuitry to enter the second low power mode after the determination that the one or more audio latency requirements are met by the second audio latency characteristic and a determination that an operation condition is met, the operation condition to be met when a reference audio stream is not required by the application.

22. The method of claim 21, further including generating fabricated audio data to include in the reference audio stream when the reference audio stream is required by the application.

23. The method of claim 17, further including:
detecting an audio activity event after the audio device has entered the first low power mode and the digital signal processor circuitry has entered the second low power mode; and
after detecting the audio activity event, (i) controlling the audio device to exit the first low power mode and (ii) controlling the digital signal processor circuitry to exit the second low power mode.

24. The method of claim 23, wherein the audio activity event corresponds to an interrupt generated by the audio device.

25. A compute device comprising:
means for comparing a first audio latency characteristic and a second audio latency characteristic with one or more audio latency requirements after detection of an audio silence event, the first audio latency characteristic associated with a first low power mode supported by an audio device associated with the compute device, at least one of an amplifier or an equalizer of the audio device to be turned off in the first low power mode, the second audio latency characteristic associated with a second low power mode supported by digital signal processor circuitry of the compute device, the digital signal processor circuitry to enter low power operation in the second low power mode, the one or more audio latency requirements associated with an application on the compute device;
means for controlling the audio device to enter the first low power mode after a determination that the one or more audio latency requirements are met by the first audio latency characteristic; and
means for controlling the digital signal processor circuitry to enter the second low power mode after a determination that the one or more audio latency requirements are met by the second audio latency characteristic.

* * * * *